United States Patent [19]
Becker et al.

[11] Patent Number: 5,699,411
[45] Date of Patent: Dec. 16, 1997

[54] DOS COMPATIBLE DICTATION AND VOICE MAIL SYSTEM

[75] Inventors: Dirk K. Becker, Newmarket; Robert H. Cook, Loretto, both of Canada

[73] Assignees: BCB Technologies Inc.; Robert Cook, both of Bolton, Canada

[21] Appl. No.: 588,022

[22] Filed: Jan. 17, 1996

Related U.S. Application Data

[63] Continuation of Ser. No. 446,065, May 19, 1995, abandoned, which is a continuation of Ser. No. 300,512, Sep. 6, 1994, abandoned, which is a continuation of Ser. No. 731,047, Jul. 16, 1991, abandoned.

[51] Int. Cl.$^6$ ............................................. H04M 1/64
[52] U.S. Cl. .................. 379/88; 379/84; 379/97; 364/221; 364/DIG. 1; 364/920; 364/DIG. 2
[58] Field of Search ........................ 379/67, 88, 89, 379/84, 97, 102; 364/200 MS File, 900 MS File

[56] References Cited

U.S. PATENT DOCUMENTS

| | | | |
|---|---|---|---|
| 4,663,777 | 5/1987 | Szeto | 379/88 |
| 4,799,144 | 1/1989 | Parruck et al. | 378/388 |
| 4,916,726 | 4/1990 | Morley et al. | 379/88 |
| 5,125,023 | 6/1992 | Morduch et al. | 379/88 |

FOREIGN PATENT DOCUMENTS

| | | |
|---|---|---|
| 0218904 | 4/1987 | European Pat. Off. . |
| 218904 | 4/1987 | European Pat. Off. . |
| 0337086 | 10/1989 | European Pat. Off. . |

OTHER PUBLICATIONS

*AT & T Technical Journal*, vol.65, No.5, Sep. 1986, New York, US, pp. 60–67; by Ackenhusen et al.; "Speech Processing for AT&T Workstations".

*Electronic Engineering*, vol.56, No.690, Jun. 1984, London GB, p. 19, "New Board Provides Voice I/O for PC".

*Primary Examiner*—Fan Tsang

[57] ABSTRACT

A hardware add-on including an interface to external I/O, a voice processor, and a micro-controller along with a terminate and stay resident program allow a digital dictation and voice mail system to run transparently on a PC operating under DOS. A hardware DTMF transceiver and software template files which equate strings representing DTMF tone signals to DOS commands permits dictation through a touch-tone phone. Voice sampling and playback speed are controlled with a reference signal and a feedback loop to an oscillator controlling the sampling rate of the voice processor. Dictation, template, and message files are DOS formatted.

3 Claims, 22 Drawing Sheets

DOS COMPATIBLE DICTATION AND VOICE MAIL SYSTEM

This application is a continuation of application Ser. No. 08/446,065, filed May 19, 1995 now abandoned, which is a continuation of Ser. No. 08/300,512, filed Sep. 6, 1994, now abandoned, which is a continuation of Ser. No. 07/731,047, filed Jul. 16, 1991, now abandoned.

BACKGROUND OF THE INVENTION

1. Field of the Invention

This invention relates to a system and method for the storage and playback of digitised voice on a host computer operating with a disk operating system and having a non-volatile memory.

2. Description of the Related Art

Conventional dictation systems use magnetic tape to store analog audio information. Retrieval is through the control of playback of recorded analog information by using an analog record/playback device specifically designed to provide features required for ease of use. This technology is referred to as ANALOG DICTATION. Within the past five years Digital Dictation Systems have been introduced on the market that replace magnetic tape with a form of digital storage (using computer hard disk media). These systems are normally in the form of specific dedicated hardware act/or software which act independently of any word processing (document) systems, or computer systems related to document processing. These systems typically have eliminated the use of magnetic tape, and have provided users with centralized access to storage and retrieval of voice information. These systems are typically manufactured as stand alone systems (not interconnected to computers or computer networks), and are of proprietary hardware and software design.

SUMMARY OF THE INVENTION

According to the present invention, there is provided a system for the storage and playback of digitised voice on a host computer operating with a single tasking disk operating system and having non-volatile memory, comprising the following: a controller operatively associated with said host computer; a voice processor operatively associated with said controller for converting incoming analog voice signals to digital signals and for converting outgoing digital voice signals to analog signals; interface means operatively associated with said controller for interfacing with external microphone means and speaker means; detection means operatively associated with said controller for detecting when the disk operating system of said host computer is idle; direct memory access means operatively associated with said controller for transferring digitised voice signals to said non-volatile memory or for retrieving digitised voice signals from said non-volatile memory under control of said controller when said detection means detects the disk operating system of said host computer is idle, whereby incoming analog voice signals are convened to digital signals and may be stored in said non-volatile memory under control of said controller and stored digital voice signals may be retrieved, converted to analog, and played back under control of said controller with minimal apparent impact on the operation of said single tasking disk operating system.

According to another aspect of the invention there is provided a method for the storage and playback of digitised voice on a host computer operating with a single tasking disk operating system and having a non-volatile memory, comprising the following steps: convening analog voice signals to or from digital voice signals; detecting when the disk operating system of said host computer is idle; transferring digitised voice signals to or from said non-volatile memory when said disk operating system of said host computer is idle; selectively retrieving digitised voice signals from said non-volatile memory; converting retrieved digitised voice signals to analog and outputting same, whereby incoming analog voice signals are converted to digital signals and stored in said non-volatile memory and stored digital voice signals are retrieved, converted to analog, and output with minimal apparent impact on the operation of said single tasking disk operating system.

BRIEF DESCRIPTION OF THE DRAWINGS

In the figures which disclose example embodiments of the invention.

DETAILED DESCRIPTION OF THE PREFERRED EMBODIMENT

Overview

Figure 1:
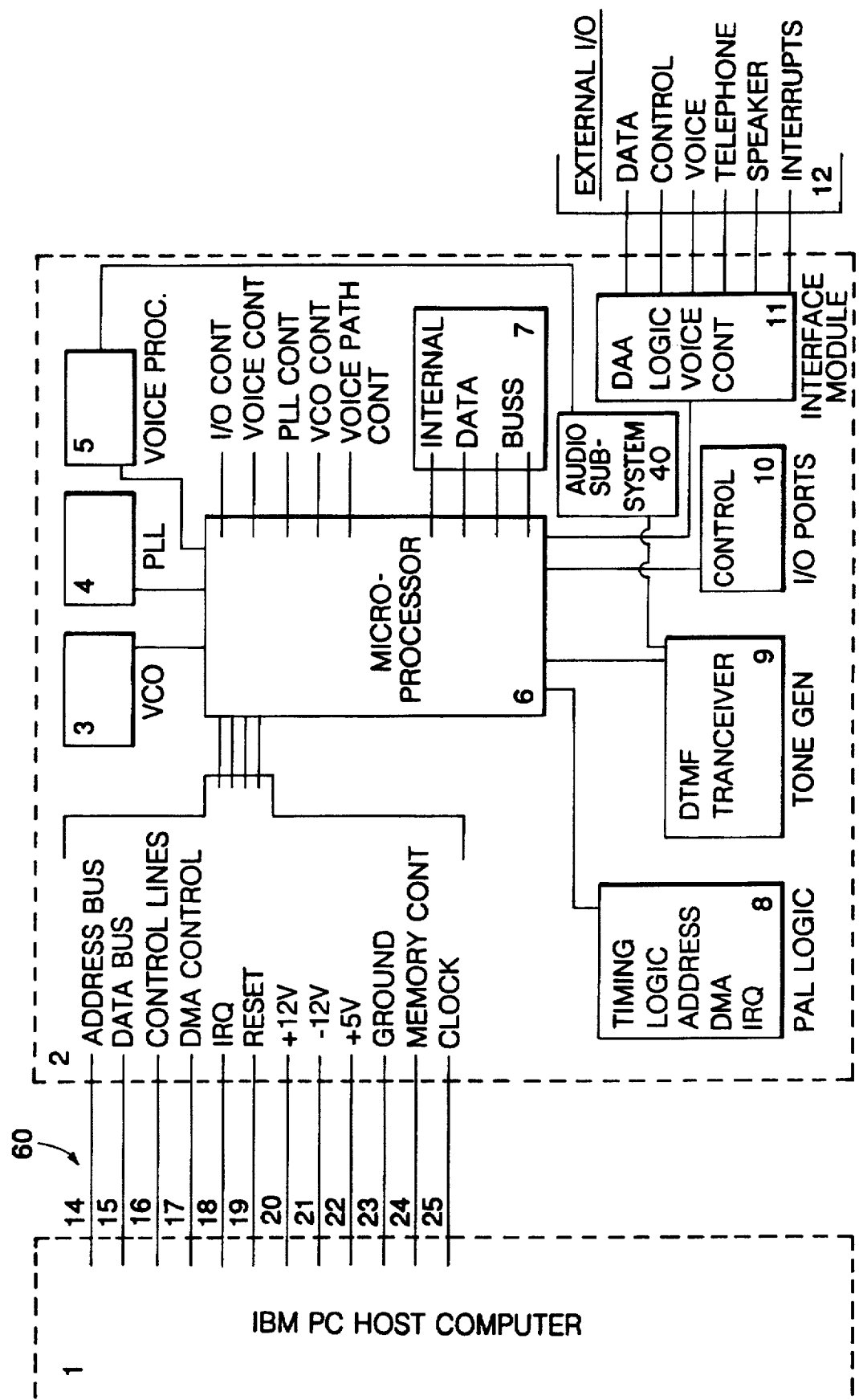
FIG. 1 is a block diagram of a PC including the expansion card which comprises the hardware of this invention.

With reference to FIG. 1, the hardware of the system comprises an expansion card 2 which may plug into an expansion slot of a host PC operating under the control of a standard disk operating system (DOS), such as a DOS produced by Microsoft Inc. The card comprises a microcontroller 6 operatively connected to the interface bus 60 of the expansion slot, a voltage controlled oscillator (VCO) 3, a phase lock loop (PLL) 4, a voice processor 5, a logic chip 8, a DTMF transceiver 9, a controller 10, and an interface 11 through an audio sub-system 40. The interface 11 interfaces with external input-output (I/O) devices 12, such as telephones and speakers. The interface 11 comprises up to four channels (seen at 104 in FIG. 9). The interface bus 60 provides various address 14, data 15, control 17, IRQ (hardware interrupt) 18, and clock 25 signals for communications. Power is supplied to the expansion card 2 through lines 20, 21, and 22 of the interface bus.

Figure 9:
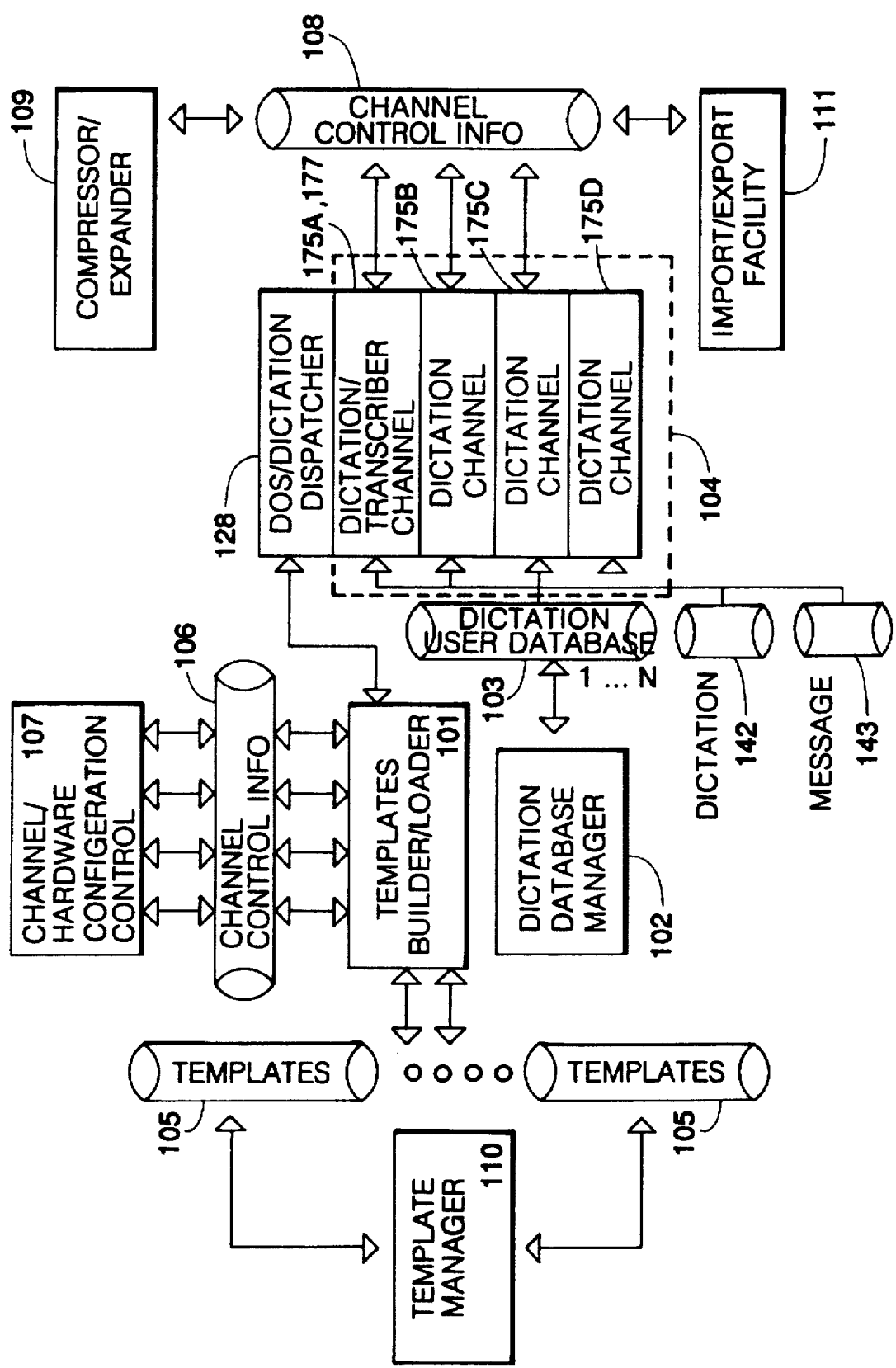
FIG. 9 is a block diagram of the software of the system of this invention.

With reference to FIG. 9, the software comprises a DOS/dictation dispatcher software module 128 which interacts with the up to four channels 104 which may be established through the interface 11. Each of the channels is associated with channel software comprising either dictation channel software 175a, 175b, 175c, 175d or transcription channel software 177 and only the first channel may be loaded with transcription channel software. The DOS/dictation dispatcher module also interacts with a template builder/loader module 101. Module 101 is used for building software templates 105; this module inputs information to, and receives information from, a channel control information file 106 which, in turn inputs information to, and receives information from, a channel/hardware configuration control module 107. The template files input information to, and receive information from, a manager module 110. A dictation database manager module 102 inputs information to, and receives information from, a dictation user database file 103. The dictation user database file 103 outputs to the channels software 104 as do dictation files 142 and message files 143. A channel control information file 108 inputs information to, and receives information from, the channel software 175, 177, a compression/expander module 109, and an import/export facility module 111. All files (i.e. template files, dictation files, message files, and dictation user database files) are DOS files (i.e., files in the standard DOS format). This means that these files may be manipulated (e.g. copied, renamed) using standard DOS commands.

Figure 2:
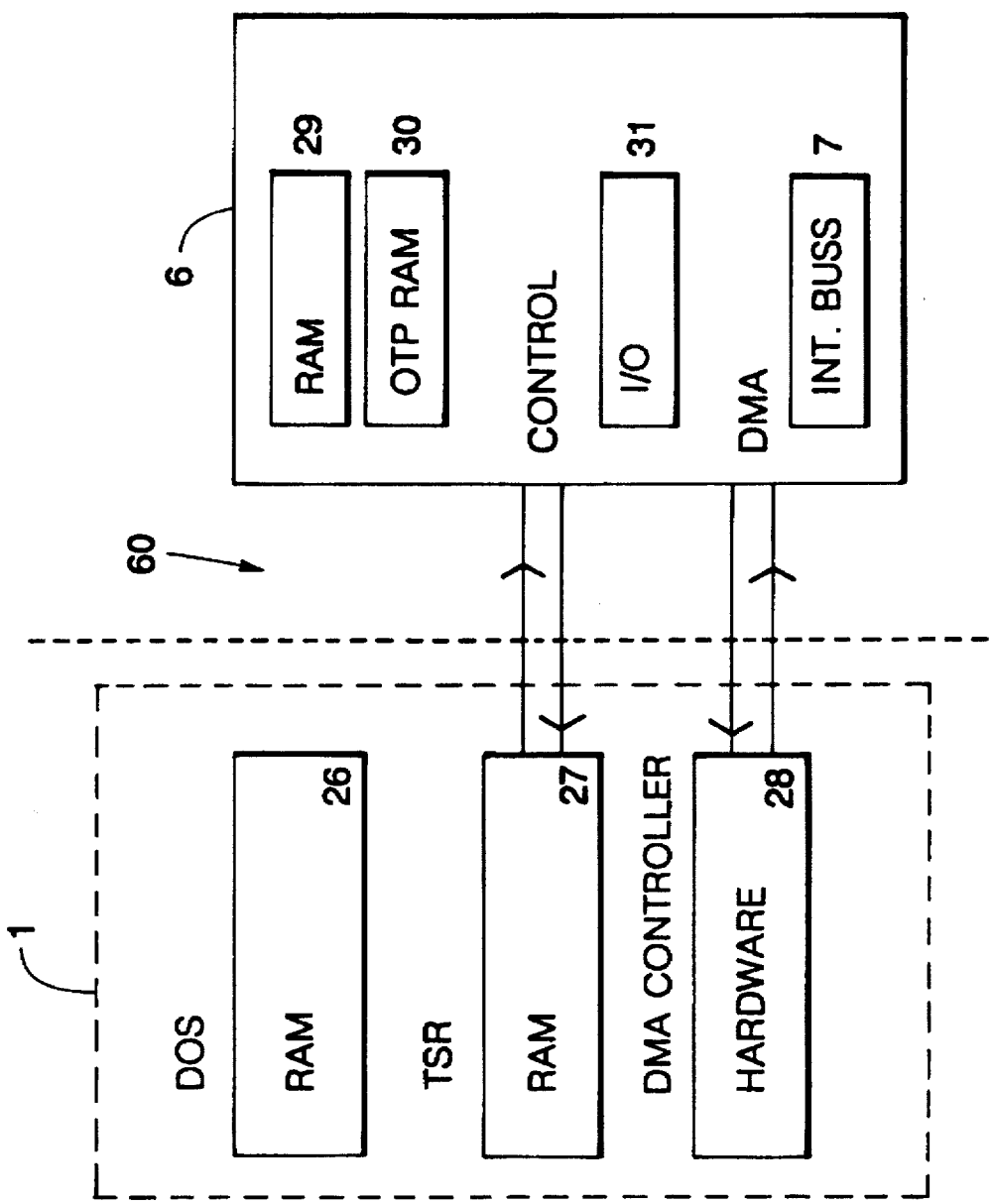
FIG. 2 is a block diagram of the software interconnection.

FIG. 2 shows the interrelationship between the hardware and the software. The software of the system is a "terminate and stay resident" (TSR) program 27 which is located in the host computer; this software interfaces between DOS 26 of the host and the micro-controller 6. Indeed, the micro-controller is controlled by the TSR program. The micro-controller interfaces with the direct memory access (DMA) controller 28 of the host.

In overview, the system operates as follows. The expansion card 2 is plugged into a host PC and system software is installed in the host. A user who wishes to store dictation may then proceed as follows. The user may dial a number for the system on a touch tone telephone in order to connect to one of the external I/O lines 12 of the expansion card. After some initialisation a channel is established for the user so that when the user speaks into the handset of the connected telephone, the analog electrical voice signal on the telephone line enters the interface 11. The dispatcher module 128 routes the voice signal to the voice processor 5 which converts it to digital format under control of the VCO 3 and PLL 4. The digital dictation data is temporarily stored in buffer RAM, then, when a block of dictation data has been accumulated, the dispatcher 128 monitors DOS for the next time it is idle. When the dispatcher detects an idle period, it temporarily disconnects DOS and dumps the accumulated block of data directly to mass storage in the host (usually a hard disk) as a dictation file 143 in DOS format. The dispatcher then reconnects DOS.

In view of this operation, the subject system is transparent to DOS. Accordingly, the subject system may run in the background while another program or application is operating on the host. In this regard, it should be noted that most programs, such as word processing programs, utilise very little computing time with the result that the host spends much of its time idle. Therefore, the dispatcher may make these memory transfers of data blocks with little if any apparent effect on the speed of the computer in the eyes of a user of a word processing program. It should also be noted that I/O devices of the host, such as the keyboard, have buffer memories of their own so that data entered while the computer is connected from DOS and under control of the dispatcher (and, hence appearing "busy" to the I/O devices) will not be lost, the time for the memory transfer being small.

The system allows the telephone user to command certain actions utilising the DTMF signals resulting from pressing the touch tone buttons of the handset, as follows. For example, the telephone user wished to review earlier dictation. A certain sequence of button presses may form a code which is known to the user to indicate this command. The DTMF signals which result from pressing the appropriate sequence of buttons are input to the interface 11 and are routed by the dispatcher to the DTMF transceiver which converts the analog signals to digital signals. The dispatcher then utilises the template files 105 to convert the signals to a DOS command which loads the particular dictation file from mass storage to RAM. More particularly, the template files 105 are look-up tables which store touch tone patterns in association with various ASCII strings. The strings are equivalent to the strings which would be output by the hoses keyboard in response to a series of keystrokes. The stored strings emulate DOS commands input through the keyboard. The dispatcher compares the received touch tone pattern with patterns stored in the template files and when it finds a match, inputs the associated string to the host to initiate the desired DOS commands. In the example case, after DOS has loaded the dictation file to RAM, the subject system can play the file back to the telephone user by sending the data through the voice processor and out to the telephone line through the interface 11.

A dictation file is stored along with indications of priority and the identity of the person who did the dictation.

A message file 143, which is not intended for transcription but merely to be relayed as voice mail is identical to a dictation file except that it contains only digital information. A person generating a message file may give commands (through a keyboard or DTMF tones) giving the file a title including an identifier of an intended recipient.

An individual who was to transcribe a dictation file would access the host (or on a networked computer) and, after some initialisation establishing a transcription channel could view files through transcription channel software 177 which would indicate priority ratings for the files. The individual could then access a desired file. This will initiate the dispatcher 128 to mute data from the file through the voice processor and the interface module to a speaker associated with the terminal occupied by the individual.

An individual who wished to listen to any message (voice mail) files intended for him could access the system and command that all files with his identifier be played back.

General Discussion

The system of this invention allows the electronic storage of analog dictation (voice) information including delivery and retrieval using an IBM personal computer (PC) and a standard operating system (DOS) in which the information is stored as a standard DOS format file on a data storage device (hard disk) while the computer can optionally be used for other purposes (running other DOS programs).

In general, the system, when installed, becomes an integral part of a PC (IBM compatible personal computer) in which the dictation system operates using computer resources of its host environment (the PC). The impact or benefits of the system are the following:

1) Reduced cost of the system (shared resources); the system may use hardware and software common to document processing and can be installed in existing computers (PCs) or computer networks.

2) Flexibility; the voice files (DOS files) may be stored, retrieved, and forwarded within any computer network environment that is itself PC compatible. Since the PC itself has become a de facto standard, the PC compatible digital dictation system of this invention can be enhanced by features afforded by the PC, and alternatively, the PC can be enhanced by the availability of integrated digital dictation.

3) Organization; since the voice files are stored as standard DOS files, the files can be managed or archived along with other document files. The files can be listed and accessed visually with a record of the person using the system, length of recording, date and time of recording, and other necessary information. All files can be password protected, and cannot be erased by normal methods without having first been listened to (transcribed).

4) Compatibility with existing systems; the system of the invention is capable of residing within most any PC compatible environment. The system requires that the PC has a non-volatile memory, preferably sufficient to provide storage of approximately two hours of dictation (e.g., approximately 20 megabytes of available hard disk storage).

5) Reliability; the system of the invention may use more than one computer which provides a built in redundancy in the event of failure of any one system. In the event of a hard disk failure in which a user is recording (dictating), very little of voice (generally no more than four seconds) can be lost. The recorded information is stored in a temporary file until the power is restored. Only in the event of the hard drive failing would there be a possibility of a major loss of dictation.

6) Modularity; in the event of failure or service, the entire system need not be replaced. This simplifies service and technical support. The balance of the system can be supported by any local computer dealer or technician. This reduces the amount of proprietary parts required to maintain a system.

The main component of the system is a printed circuit board that plugs directly into an expansion slot within the PC itself. This expansion card format is an industry standard. Further to this hardware, software is provided as pan of the invention that interfaces the invention hardware to the computer software and hardware making it act as one. By providing different configurations of the basic invention, a wide variety of inputs (microphones, telephones, etc.) and interconnections can be made without changing the basic structure of the invention (the expansion card). This invention and its disclosure is centred around such hardware (expansion card) and software that does not change, and is the controlling architecture for the system (system being defined as more than one expansion card).

Dictation can be performed by interconnecting the invention to the telephone system either through a PBX, or directly to a central office telephone line (subscriber line). By using a DTMF telephone (touch tone), the user can access the system and store dictation information directly to the computer hard disk or to another hard disk located within a network environment (assuming the computer is connected to a network). The invention controls all telephone interconnect requirements, and in turn responds to the commands of the computer or user. The invention converts the DTMF tones into a series of user defined instructions. Dictation also can be performed using a direct wire telephone link using a standard touch tone telephone (subscriber line interface). The invention may recognize when the telephone receiver is picked up (when the user goes "off hook"), or when the central office provides a ringing signal to the system. The system may return to its idle state (goes "on hook") when the user either hangs up or disconnects from the system through the use of the DTMF commands.

The invention may have a replaceable interface module that increases the flexibility of the invention by allowing hardware changes to meet specific system requirements dictated by the market, and not limiting the device to any form of either digital or analog input a specific application might require. This module can be changed to meet specific telephone company technical requirements, such as foreign telephone standards.

By interchanging the interface module, the invention can meet the specific requirements of transcription. Specifically, additional hardware is supplied to provide a transcription interface to the user generally known as a "secretary". The secretary is provided with all the functions afforded by any other dictation system, digital or analog. The transcription interface has a foot-switch, headset, volume control, speed control, tone control, and an operational panel that displays various functions similar to a generic analog transcriber unit. This invention has analog inputs and outputs that make it compatible with other systems. The transcriber unit is interconnected to the PC expansion card using a specific interface module designed specifically for the transcriber unit. This unit contains both modular hardware and software allowing flexibility in future designs or features.

Numerous PC expansion cards can be installed within one computer. Generally speaking, one dictation channel and one transcription channel is installed within one PC. However, depending on the host PC and, more specifically, to the amount of host computer memory (RAM), the number of expansion slots available, and other more specific limitations, up to four channels can be installed within one computer chassis. The invention has been designed specifically to address multiple channels within a single PC environment.

The system of the invention, by way of its design, provides voice response (feedback) to the user in any preferred language through the use of pre-recorded messages. To further supplement operation, tones (single frequency) may be used to indicate to the user various conditions of operation or warn the user of a change of status or function of the system.

The system of the invention, by use of specific software and hardware design, can provide functional interaction to the computer for use other than storage or retrieval of dictation information. The architecture of the software allows the manufacturer, user, or installer of the system to run and interact with other hardware (such as facsimile products) and provide interactive functions that would normally only be available if the user were to command the function through the use of the computer screen and keyboard.

The system of the invention, by use of a dedicated micro-controller on the PC expansion card, relieves the "load" on the host computer. Also, by way of specific design (both hardware and software), faster and more reliable transfer of digital voice information directly to the storage media (hard disk) is possible, increasing the utilization of the computer for other tasks (programs). More specifically, the expansion card uses DMA (direct memory access) to transfer information to or from the micro-controller 6 (FIG. 2) of the expansion card without directly involving an existing application (program) that may be operating independently.

The system, by way of software design, allows the dictation units to act as an integrated system (multiple dictation devices) in which there are centralized control of passwords and management functions that are similar to those of dedicated centralized systems, and provide increased range and benefits of using local area networks, or wide area networks (assuming the computers are already connected to such networks).

The system, by way of design, can provide greater reliability and redundancy compared to existing centralized dictation systems when connected by way of a local area network. The dictation can be stored on the network or stored on the local PC storage device and transferred to another storage device at a regular interval for archival or to meet redundancy requirements. In the event of power failure, the system will not lose more than four seconds of stored information, that being the last four seconds of recording. This does not apply to playback or transcription of voice files.

The system of the invention does not limit the user from selecting a preferred brand or type of computer. The user has the option of selecting the equipment (if not already purchased) to best optimize the system for a particular dictation or document processing application.

The system allows compatible integration of a wide variety of hardware and software to tailor the system for specific applications that require voice storage and retrieval but not necessarily the specific requirements of a digital dictation system. This includes order entry systems, data collection systems, and voice message applications. The system allows integration with existing applications and will run independently while other applications are running.

The system, through the use of a TSR (transient resident program) operates in a "background mode of operation". A background program is a program that is not apparent to the computer user while another program is operating. The TSR uses a portion of the system memory, and is installed when the computer is powered up. The TSR manages the invention and interfaces the invention to the host computer through the DOS operating system.

By use of the TSR and template architecture, the system can be controlled by existing programs either by accessing the TSR at a low level (programmer interrupt calls) or at a higher level in which ASCII text can be forwarded to a preselected output. Feedback to the program can be via the keyboard input in which the program would interrogate the keyboard input to determine status or information or through programmer interrupt calls.

By way of the software TSR, the system can provide text-to-speech function from either the screen, or transparently where information is sent to an output port (predefined in the template). ASCII text is converted to speech, and sent to the user as a form of voice feedback. The ASCII text is forwarded to a software speech library system in which the word is looked up in a table, and, if found, a corresponding voice word is played back. The voice words are stored and manufactured by a voice library word generator (software program).

By ways, of hardware and software architecture, the system is totally DOS compatible. By way of design, the system is capable of operating in a network environment such as Novell. Novell is a manufacturer of network software systems.

HARDWARE

Voice Processing

Figure 4:
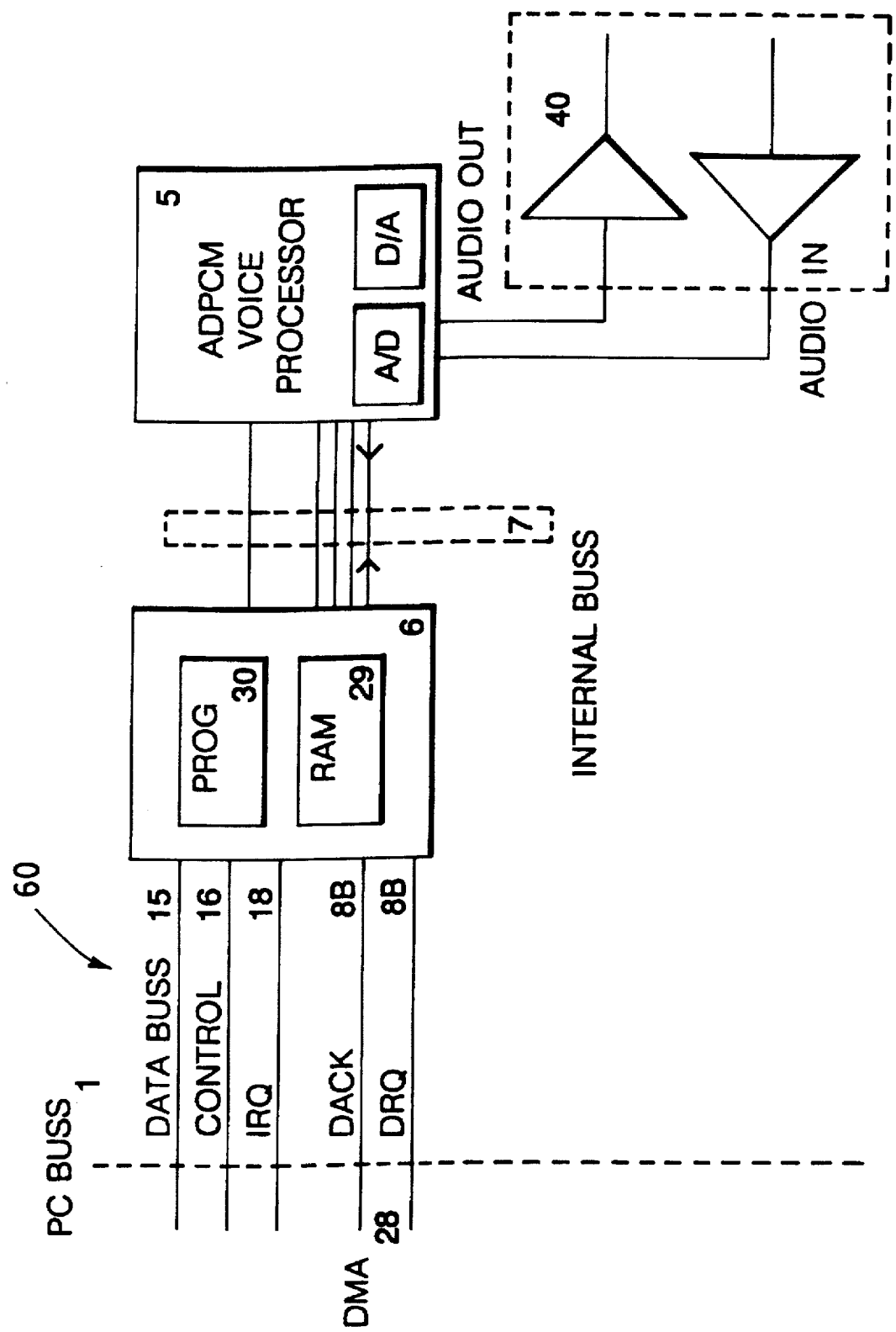
FIG. 4 is a block diagram of analog/digital signal path.

Referring to FIG. 4, audio signals are received by the voice processor 5 after being amplified and processed by the audio subsystem 40. Analog electrical voice signals entering the voice processor are sampled, converted to digital signals, and compressed; more specifically, known adapative digital pulse code modulation (ADPCM) techniques are used. The ADPCM signals are then passed via the internal data bus 7 to the micro-controller. The ADPCM data signals may be passed by the micro-controller to the host via data bus 15 of bus 60. This operation may be reversed to pass ADPCM data from the host through to the audio subsystem 40 after reconversion back to an analog audio signal. The voice processor also accepts control from the micro-controller 6.

Figure 6:
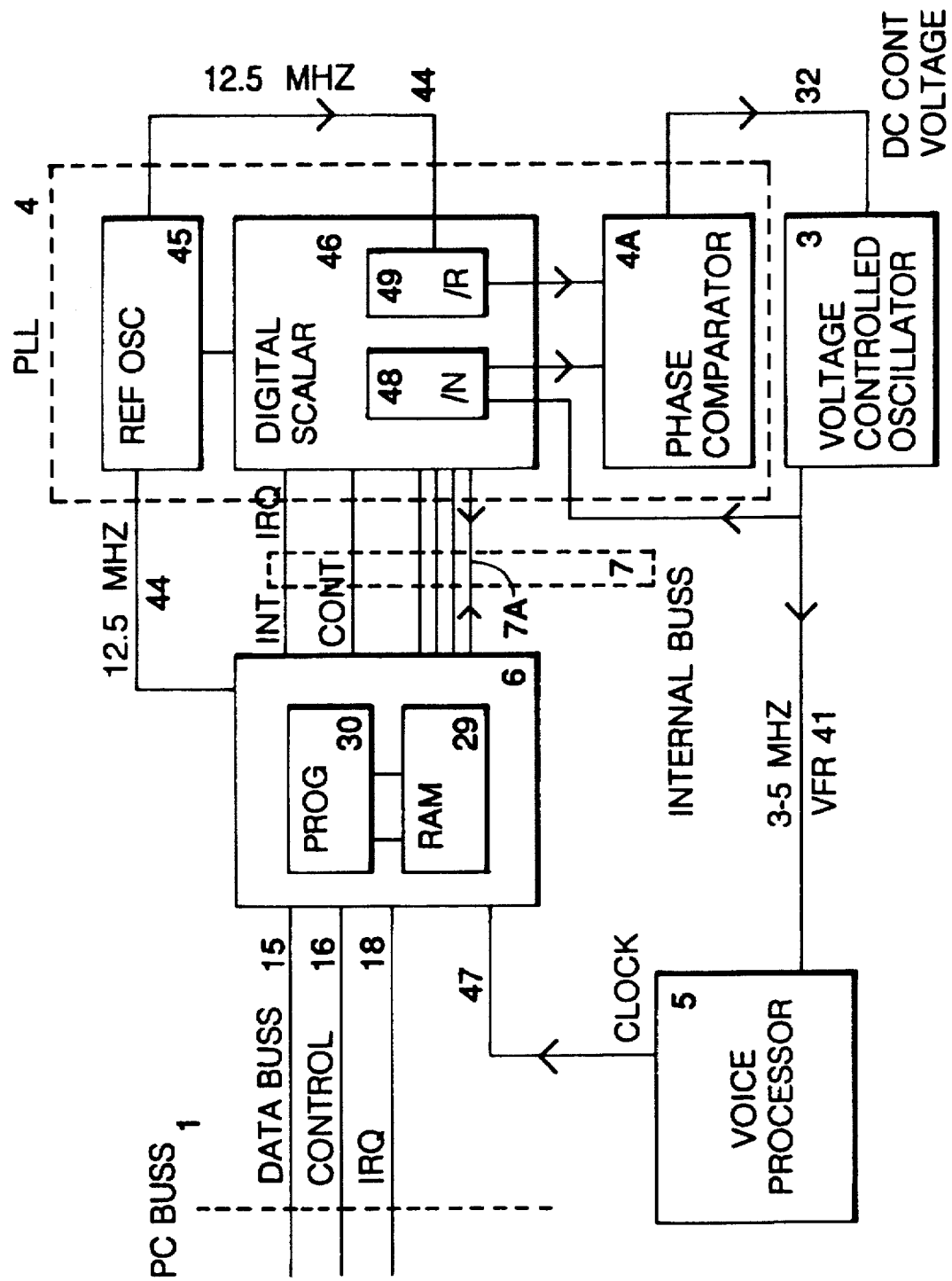
FIG. 6 is a block diagram of phase lock loop /VCO.

It is desirable to be able to control the sampling rate of the voice processor so as to accommodate variable speech rates or different record rates. With reference to FIG. 6, this is accomplished as follows. A phase lock loop 4 comprises a reference oscillator 45, which typically outputs 12.5 MHz, a digital scalar 46, comprising an R divider 49 and an N divider 48, and a phase comparator 4a. The reference oscillator receives an input from micro-controller clock line 44. The micro-controller clock will have the same frequency as the reference oscillator and this connection ensures the output of the reference oscillator is locked synchronously to the micro-controller clock. The R divider 49 receives a reference frequency input from the reference oscillator 45 and divides this by a number, R so that it outputs a frequency which is a fraction of the reference input frequency. The R divider outputs to phase comparator 4a. An N divider divides a frequency signal input to it by a number, N, and also outputs to the phase comparator. The phase comparator, in turn, outputs to VCO 3. There is a feedback loop from the output of the VCO back to the input of the N divider with the result that the N divider outputs the frequency output by the VCO, divided by N. The digital scalar is input from the micro-controller on lines 7a of the internal data bus 7. Lines 7a may be used to program a value for N and for R. Consequently, a user may vary N and R.

The operation of the PLL and VCO are as follows. A number is chosen for N and for R by a user and these numbers are passed to the micro-controller and programmed into the N and R dividers. Say, for example, R is chosen as 12.5 so that the output of the R divider is 100 kHz and N is chosen at 50. Say, initially, the output of the VCO is a 2.5 MHz signal so that the output of the N divider is 50 kHz. The phase comparator compares the R divider and N divider outputs. Since N is quite a bit smaller than R, indicating the frequency of the VCO is quite a bit lower than desired, the comparator ups the voltage to the VCO to up its frequency. This has the effect of increasing the output of the N divider to, say, 105. Now a comparison by the phase comparator indicates only a small difference with the output of the N divider being larger than the output of the R divider so the phase comparator slightly reduces the value of the voltage to the VCO, and so on, until the output of the N and R dividers are equal and the VCO outputs a signal at 5 MHz.

It will thus be apparent the output of the VCO may be controlled over a large range by judicious choice for the values of N and R.

The VCO outputs to the clock input line 41 of the voice processor 5. Consequently, the VCO frequency controls the sampling rate of the voice processor. Thus, N and R may be chosen to accommodate variable speech (playback) rates or different record rates. As will become more apparent hereinafter, a transcribing operator may choose N and R values by setting a speed control footswitch in order to control playback speed.

The voice processor outputs a reference clock signal to the micro-controller on line 47. The voice processor has an internal divider so that this reference clock signal is equal to the sampling rate generated by the voice processor 5. This reference clock will interrupt the micro-controller 6 to initiate a read operation of valid information from the voice processor in record mode and to generate a write clock for the micro-controller 6 in playback mode.

DTMF Signals

Figure 5:
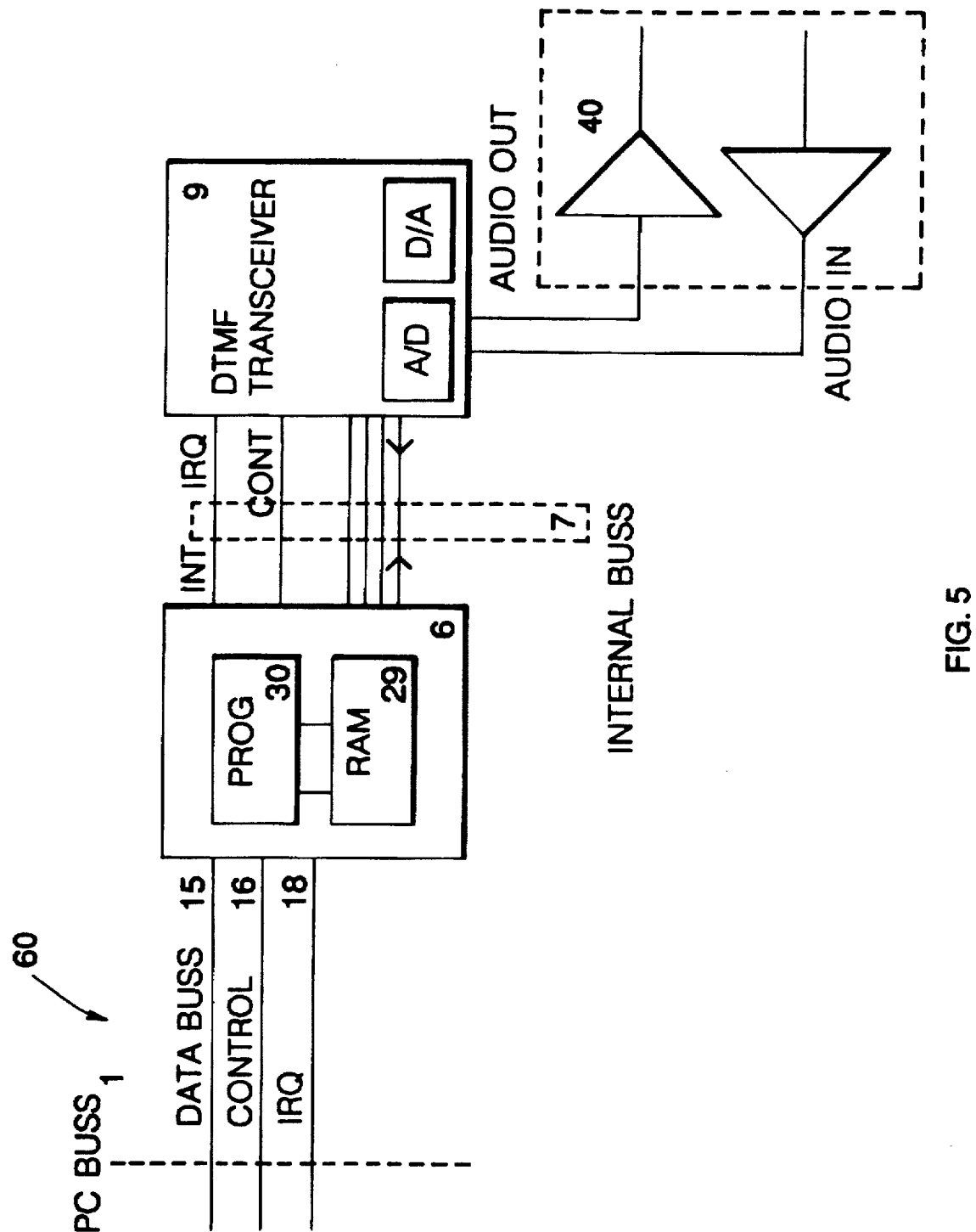
FIG. 5 is a block diagram of DTMF signal path.

With reference to FIG. 5, the DTMF is a combination of two audio frequencies that are detected by the DTMF receiver 9 after amplification and processing by audio subsystem 40. Upon receipt of a valid tone, an interrupt is generated to signal the micro-controller 6 that there is a signal present. The micro-controller then interrogates the DTMF transceiver and the identification of the tone is transferred by the internal bus 7. After a read cycle has been completed, the DTMF transceiver is reset to receive the next valid tone. The transceiver can generate with various parameters such as tone length and frequency. The micro-controller transfers the tones to the host computer via the data bus 15 of bus 60.

Telephone signalling varies from country to country, therefore the parameters must be changed accordingly.

External Devices

Figure 8:
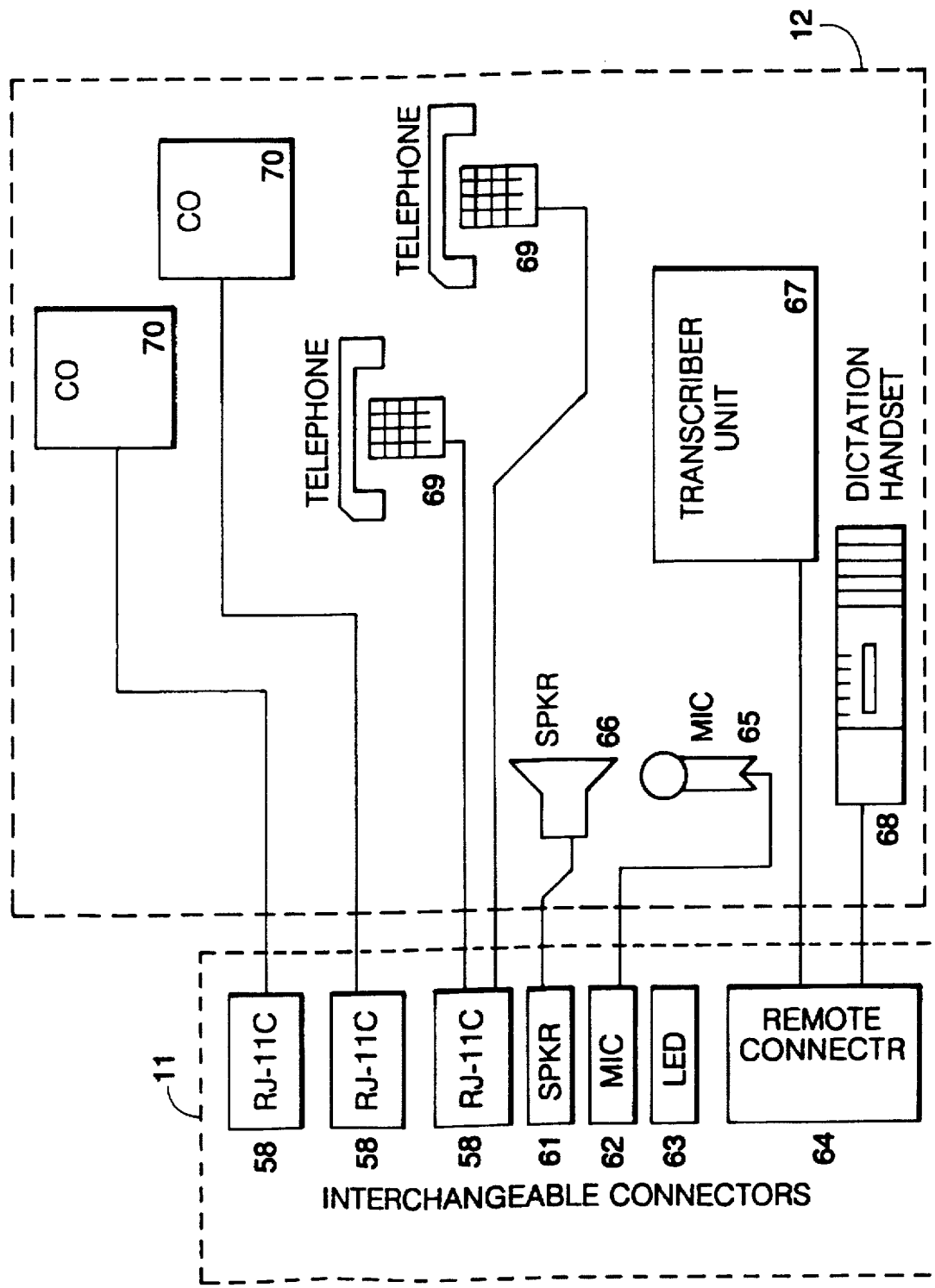
FIG. 8 is a block diagram detailing a portion of FIG. 1 indicating external interface options.

Turning to FIG. 8, the interface 11 may comprise a number of RJ-11C jacks 58 that can support multiple telephone lines, or a combination of telephone lines and subscriber lines (internal telephone lines) connected to external I/O devices 12 comprising telephone handsets 69 or central office switches 70. The interface may also comprise a connector 61 that can handle a speaker 66 and a connector 62 for a microphone 65. The interface has an sixteen wire connector 64 for a transcriber unit 67. A direct wired dictation handset 68 can be connected to the remote connector 64 to handle local dictation requirements.

Transcriber Unit

Figure 11:
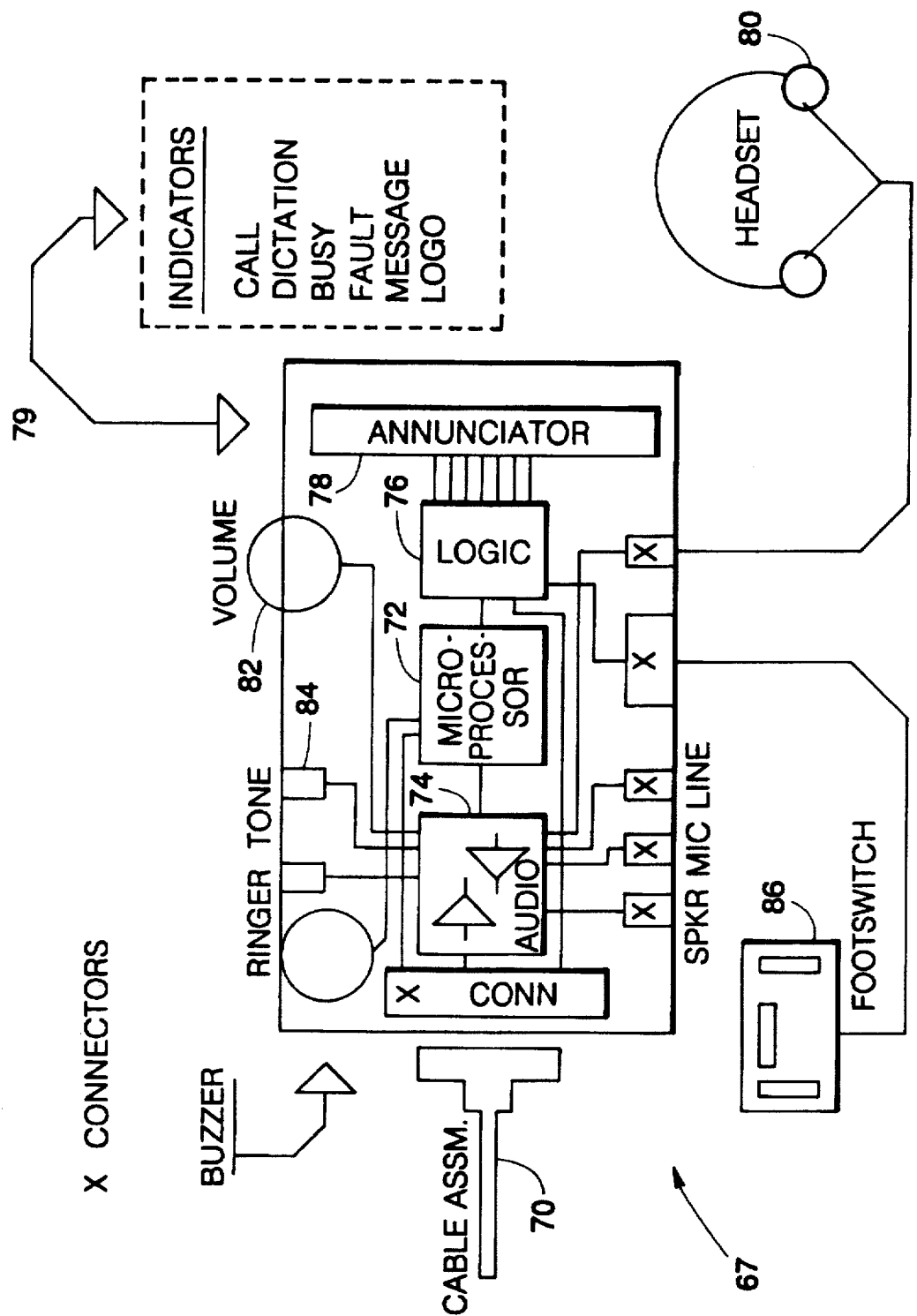
FIG. 11 is a block diagram of remote transcriber control unit.

FIG. 11 illustrates a transcriber unit 67. The unit has a cable 70 between the connector 64 of interface 11 (see FIG. 8) and a processor 72, audio controller 74, and logic unit 76. The logic unit is connected to an annunciator 78. The audio controller interconnects to a headset 80 and volume control 82. A footswitch 86 is connected to the logic unit 76.

As aforenoted, the position of the footswitch may be used to provide a signal which generates N and R values for the voice processor 5 of FIG. 6 in order to control playback rate of audio signals to the headset 80.

Flexibility

Figure 7:
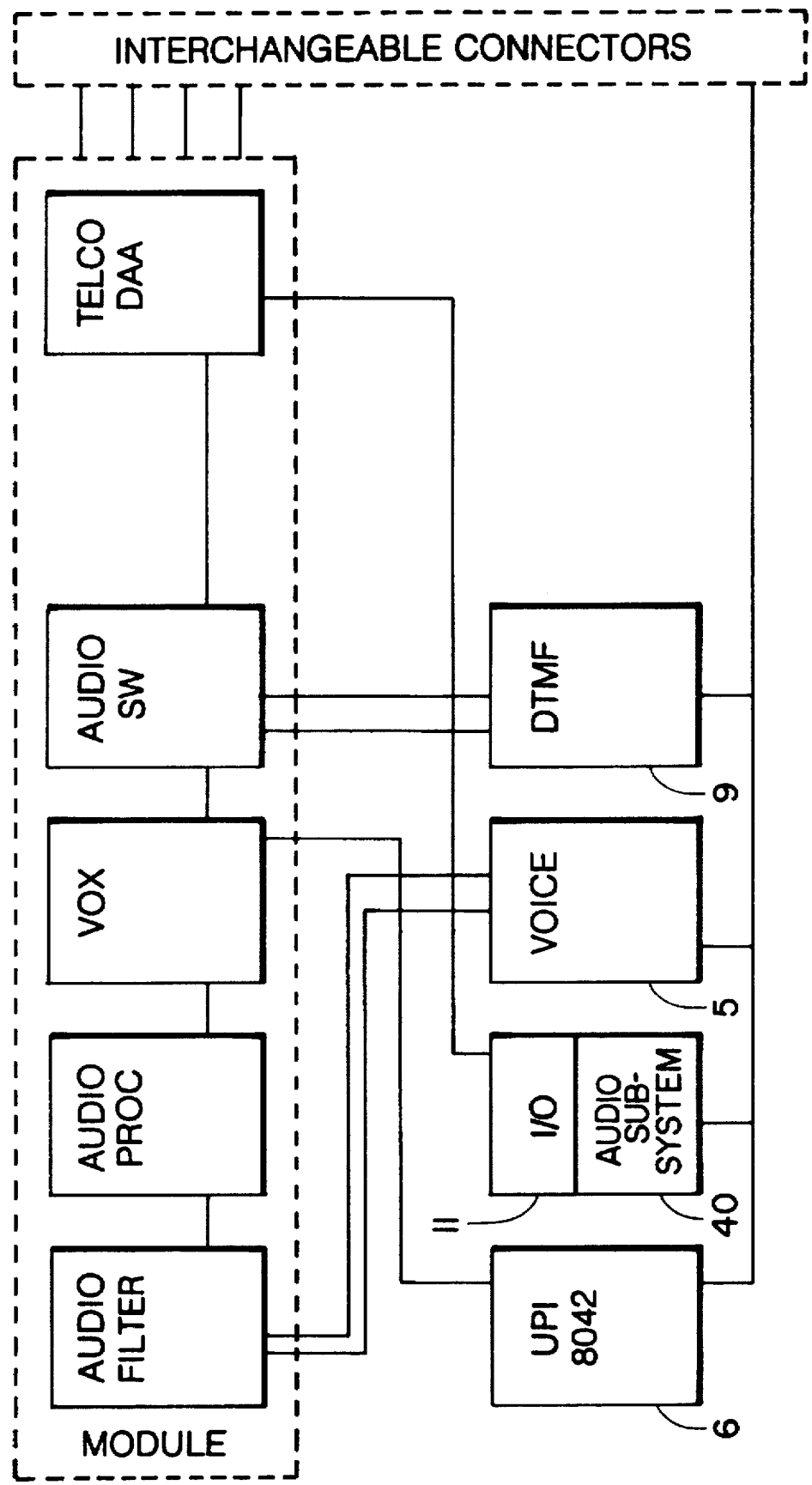
FIG. 7 is a block diagram of an interchangeable interface module for the expansion card.

With reference to FIG. 7, the expansion card has an interchangeable architecture by which the basic expansion card can be used for a variety of applications or functions. The interface module can have a variety of control, audio, power, and telephone interfaces to comply with various options or standards requirements. This reduces the cost of manufacture, but more importantly provides functional advantages.

Figure 12:
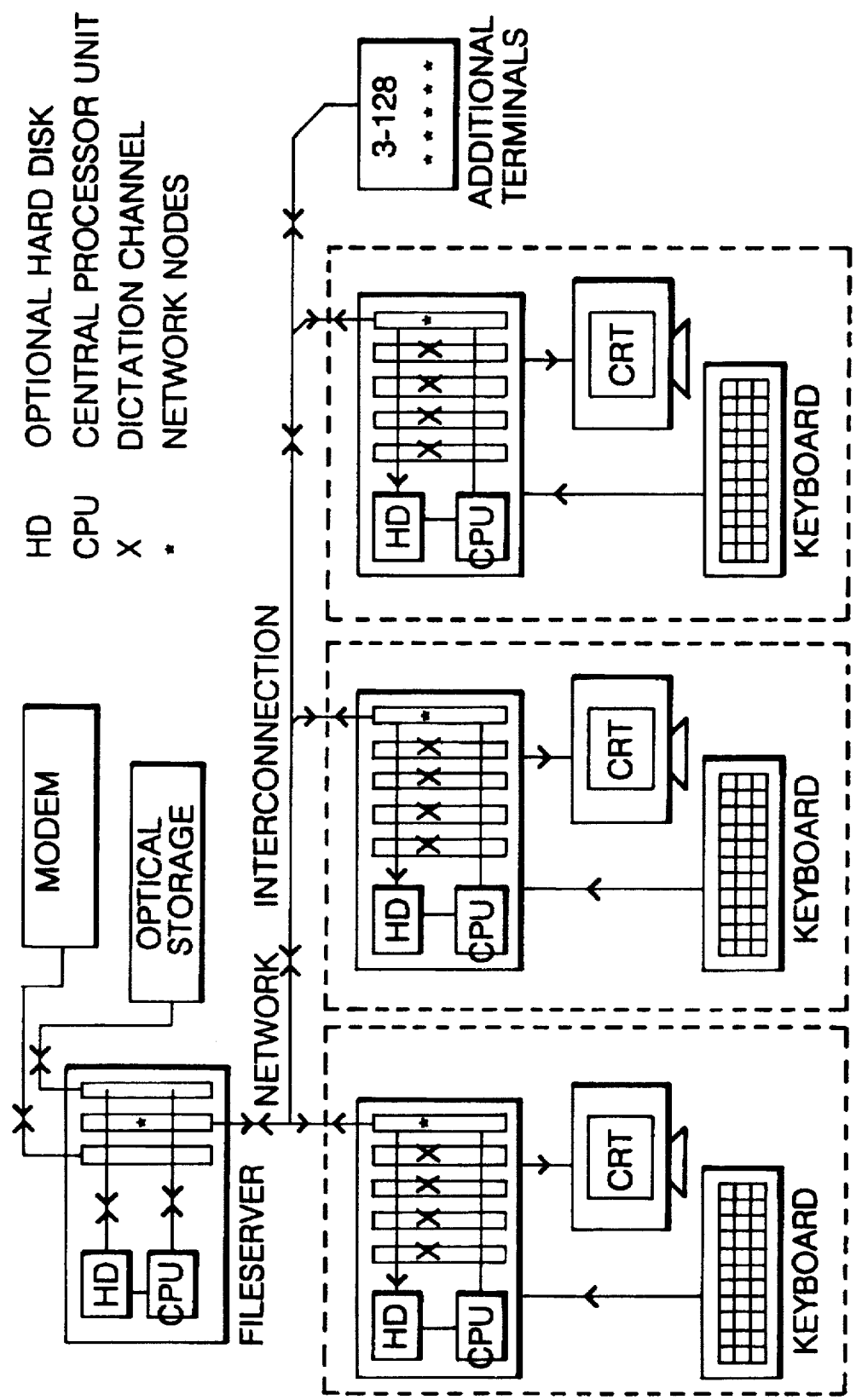
FIG. 12 is a block diagram of a multi channel architecture for the system of this invention.

FIG. 12 illustrates an architecture for networking a number of computer terminals 88 in order to implement the subject system on a grander scale.

SOFTWARE

Overall Structure

The software acts as an interface between the aforedescribed hardware and between a user of the system and the system itself. With reference again to FIG. 9, the software consists of several separate programs, each responsible for different functions within the overall design. The first level in the design is creation and maintenance of control files which are templates 105 and dictation user databases 103. The control files (and all other database files) are configured as DOS files. The first level of software consists of two primary programs: the template builder/loader module 101 and the dictation database manager module 102. The template builder/loader module allows the user to create and maintain one or more templates while the dictation database manager 102 allows the user to create and maintain dictation user databases 103.

Other software interfaces control files from the first level with channel control software, namely, channel control information module 106 and channel/hardware configuration control module 107. The template builder/loader module has the additional purpose of interfacing the templates with the channel control software by loading each channel with one template.

Templates

Figure 22:
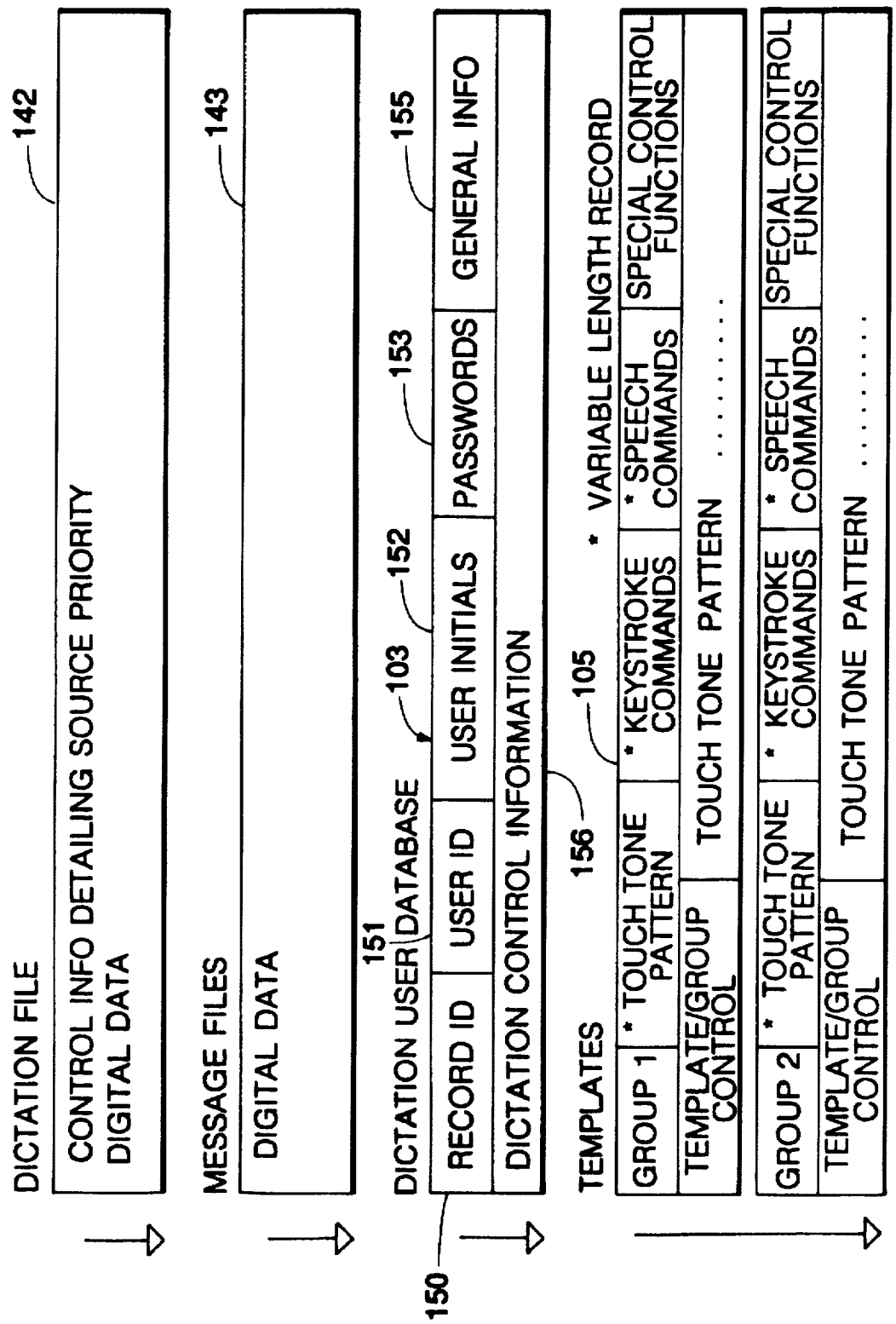
FIG. 22 is a block diagram of the file formats for the record files of the system of this invention.

A template is a look-up table; it defines a collection of groups containing touch tone patterns. FIG. 22 shows a template file structure. With reference to this figure, it is seen that each of a number of touch tone patterns in a particular template file has associated with it a keystroke/command line (which, as aforedescribed, is the ASCII string for a DOS command), a speech/command line and a variety of special functions.

The template has a series of instructions which can be forwarded to the host computer in the form of keyboard or control commands in response to DTMF tones or application request. By way of the TSR input and output to the host computer can be achieved with redirected I/O (input and output).

Template Builder/Loader Module

Figure 13:
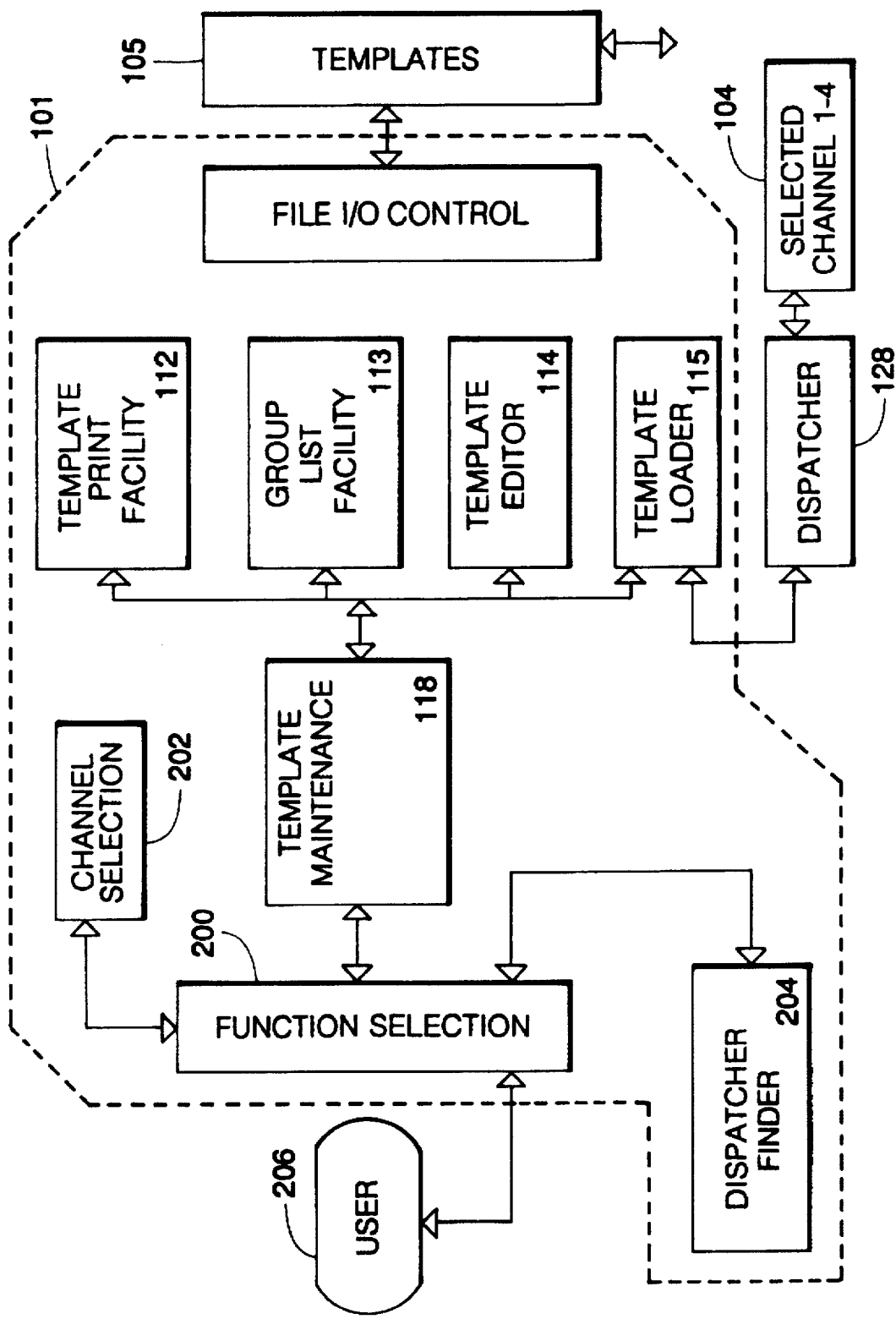
FIG. 13 is a block diagram of the template builder/loader of FIG. 9.

The template builder/loader module 101 is detailed in FIG. 13. The module comprises a template maintenance program 118 which interacts with a template print facility 112, a group list facility 113, a template editor 114, and a template loader 115. The template loader interacts with the external DOS/dictation dispatcher module 128 which, in turn and as aforenoted, interacts with the channels 104. The template maintenance program also interacts with a function selection block 200, which in turn interacts with a channel selection block 202, a dispatcher finder 204, and an external user 206. The module further includes an I/O control block which interacts with the templates 105.

The template builder/loader module 101 allows a user, through the use of menus, to select a channel for use and/or maintain a template file. Template maintenance options include a print facility, a group list facility, a template editor, and a template loader. The template editor allows the user to define groups, tone patterns, and associated keystroke/command and speech/command patterns and special functions. The template loader interfaces the template file with the DOS/dictation dispatcher module which assigns the template to the currently selected channel 104.

Further Comments on Templates

With reference to FIG. 22, a template is organised into groups, each group containing a group indicator and a series of touch tone patterns (that is, strings representing digitised DTMF signals) each associated with keystroke commands (which are ASCII strings equivalent to the strings output by a keyboard), speech commands (which are digitised speech), special control functions, and template/group control functions (which are strings indicating another group in the template or another template). A default group of the template also includes speech commands associated with the group indicator. As aforenoted, and with reference to FIG. 9, a template file 105 is loaded to each channel by the template builder/loader 101.

When a user is connected to a channel of the system through a touch tone phone, the default group in the template is indicated and the speech commands associated with default group indicator are passed through the voice processor (5 of FIG. 1) and output to the connected telephone to the user as analog voice signals. These voice signals may invite the user to enter one of several touch tone patterns. When the user enter a DTMF tone, the group of the template is searched for the entered touch tone pattern. On finding a match, the following occurs. The keystroke commands associated with the matching touch tone pattern are input to the host and these keystroke commands are interpreted by the host as DOS commands, associated speech commands are sent to the user which may invite the entry of further DTMF tones and the associated template/group control function may indicate another group of the template which causes control to pass to that other group. If control is passed to another template group, then it is that other group that is searched for matching touch tone patterns when the user enters further touch tones.

The template/group control function may even indicate another template which will cause the indicated template to be loaded into the channel in place of the first template loaded to the channel.

Channel Control

With reference again to FIG. 9, channel control is handled by the DOS/Dictation dispatcher module 128. Four channels may be maintained with the first channel reserved for a dictation/transcribe channel and the remaining three channels used for dictation. Thus, the channel control software allows up to four incoming dictation lines (such as telephone lines, local microphone lines and remote microphone lines) to be connected to one host PC.

Figure 19:
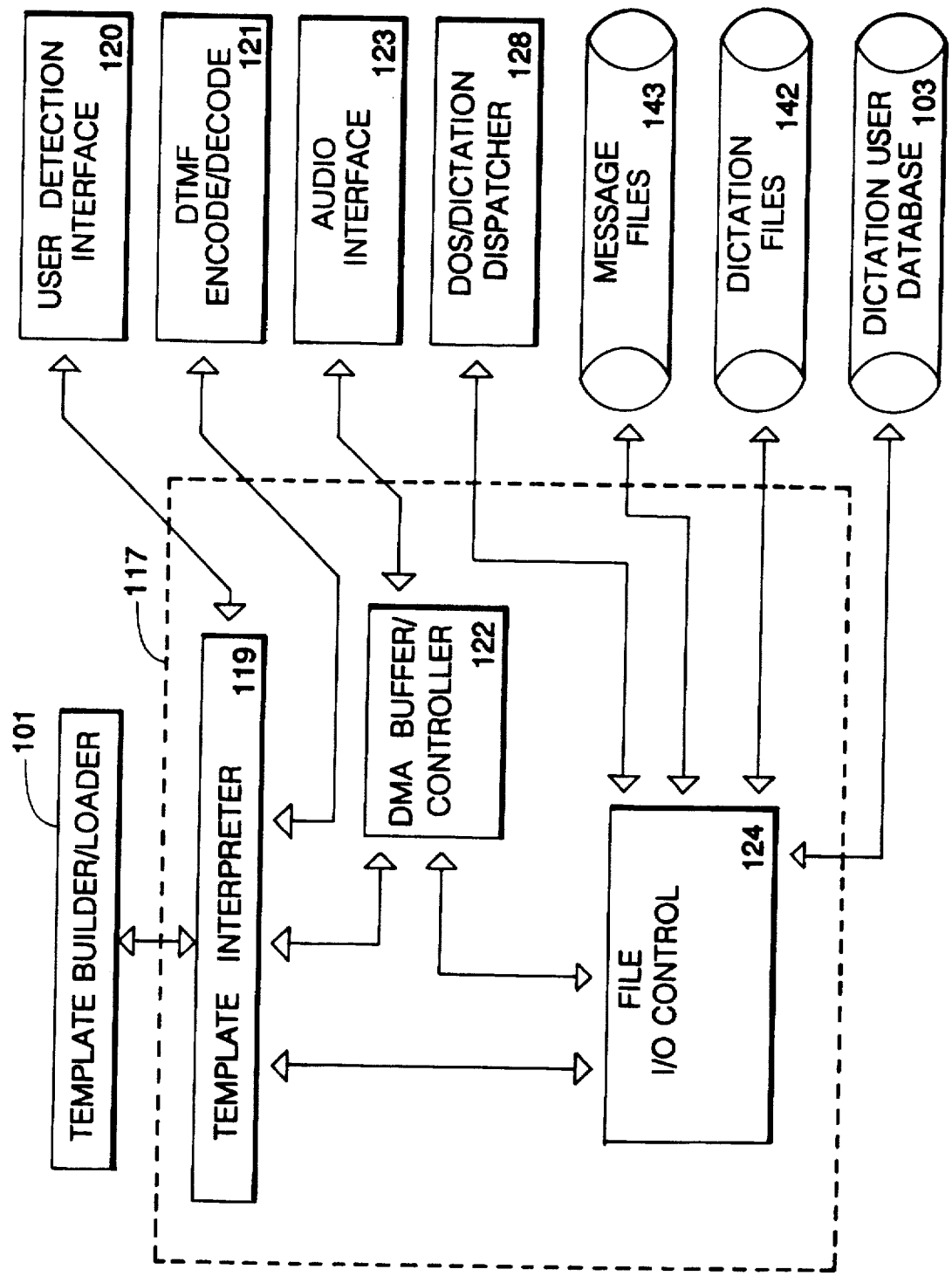
FIG. 19 is a block diagram of a dictation channel.

The dictation channel software 117 provides an interface between the first level of control software (i.e., the template builder/loader module and the dictation database manager module) and hardware. It is at this level that template files 105 created by the template builder/loader software are interpreted. With reference to FIG. 19, the dictation channel software 117 comprises a template interpreter 119 which interfaces, externally, with the template builder/loader module 101, a user detection interface 120, and a DTMF encoder/decoder 121. Internally, the interpreter interfaces with a DMA buffer/controller and with file I/O control 124. The file I/O control interfaces with the DOS/dictation dispatcher 128, message files 143, dictation files 142, and dictation user databases 103.

In operation, the DOS/dictation dispatcher regularly calls the dictation channel software to allow recognition of signals from user detection hardware 120 and DTMF tones from a telephone keypad. The recognized signals are transferred into a sequence of keystrokes, commands, and special functions by the template interpreter by the interpreter interrogating the template currently associated with the channel from which the signals came. These commands and functions provide controlled access via the Dictation User Database 103 to the dictation 142 and message 143 files and controlling the playback/recording of these files by DMA buffer control 122 and file I/O control 124.

Transcription Control

Figure 20:
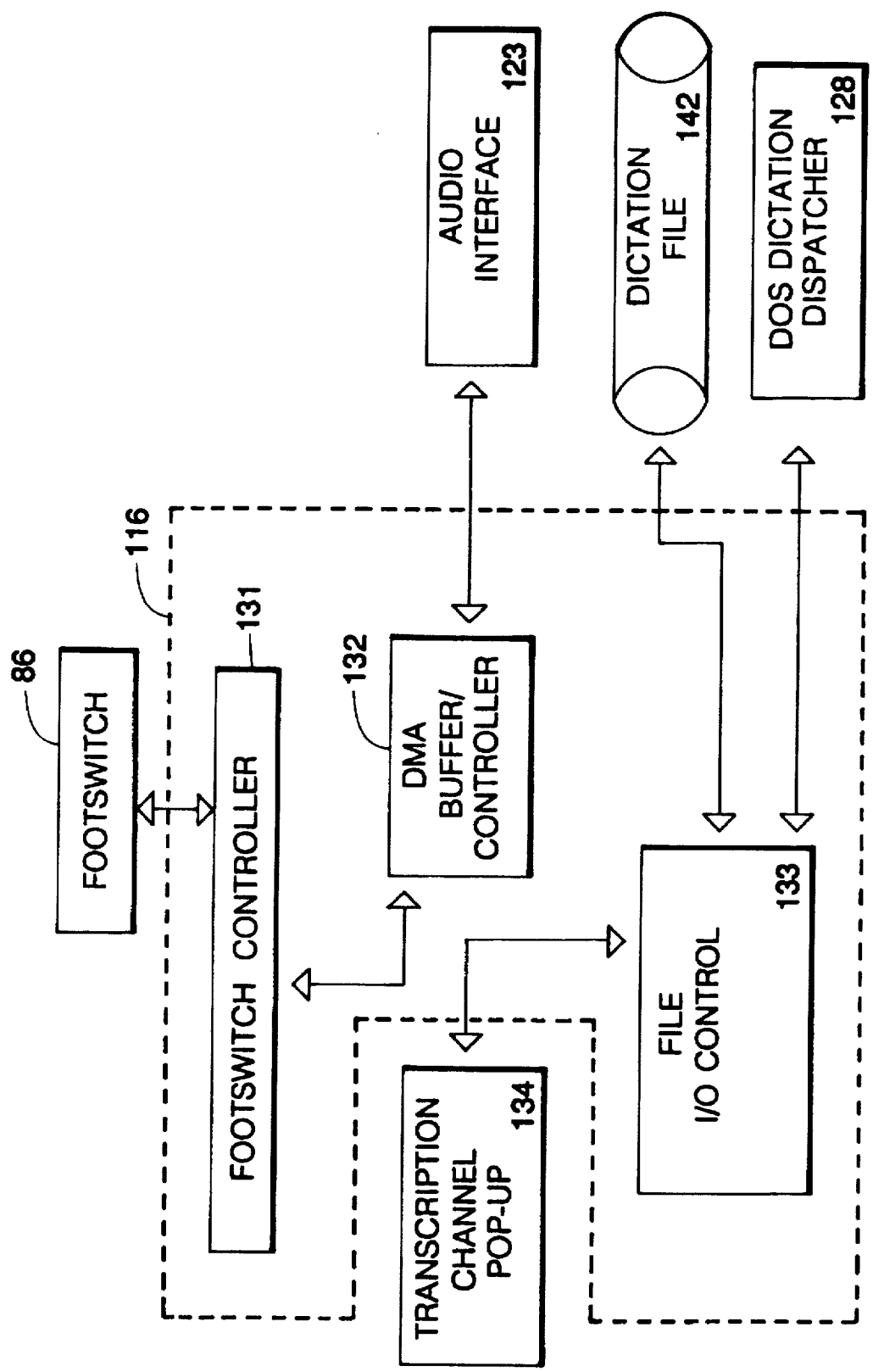
FIG. 20 is a block diagram of a transcription channel.

A transcription channel is used for the playing back of previously recorded dictation files. The format of a dictation file is illustrated in FIG. 22. In addition to data, the file includes control information detailing its priority. With reference to FIG. 20, in operation of the transcription channel, the DOS/dictation dispatcher 128 regularly calls the transcription channel software 210 to respond to input from the foot switch 86 which is interpreted by the foot switch controller 131 to control the playing back of a dictation file 142 via a DMA channel 132 and the audio interface 123. Data from the dictation file is retrieved from storage a block at a time and is then sequentially fed to the audio interface 123. The footswitch controller 131 determines the speed of playback and positioning of logical pointers within the dictation file by noting changes in switch positions. The user has control over file selection via the transcription channel pop-up 134.

Figure 18:
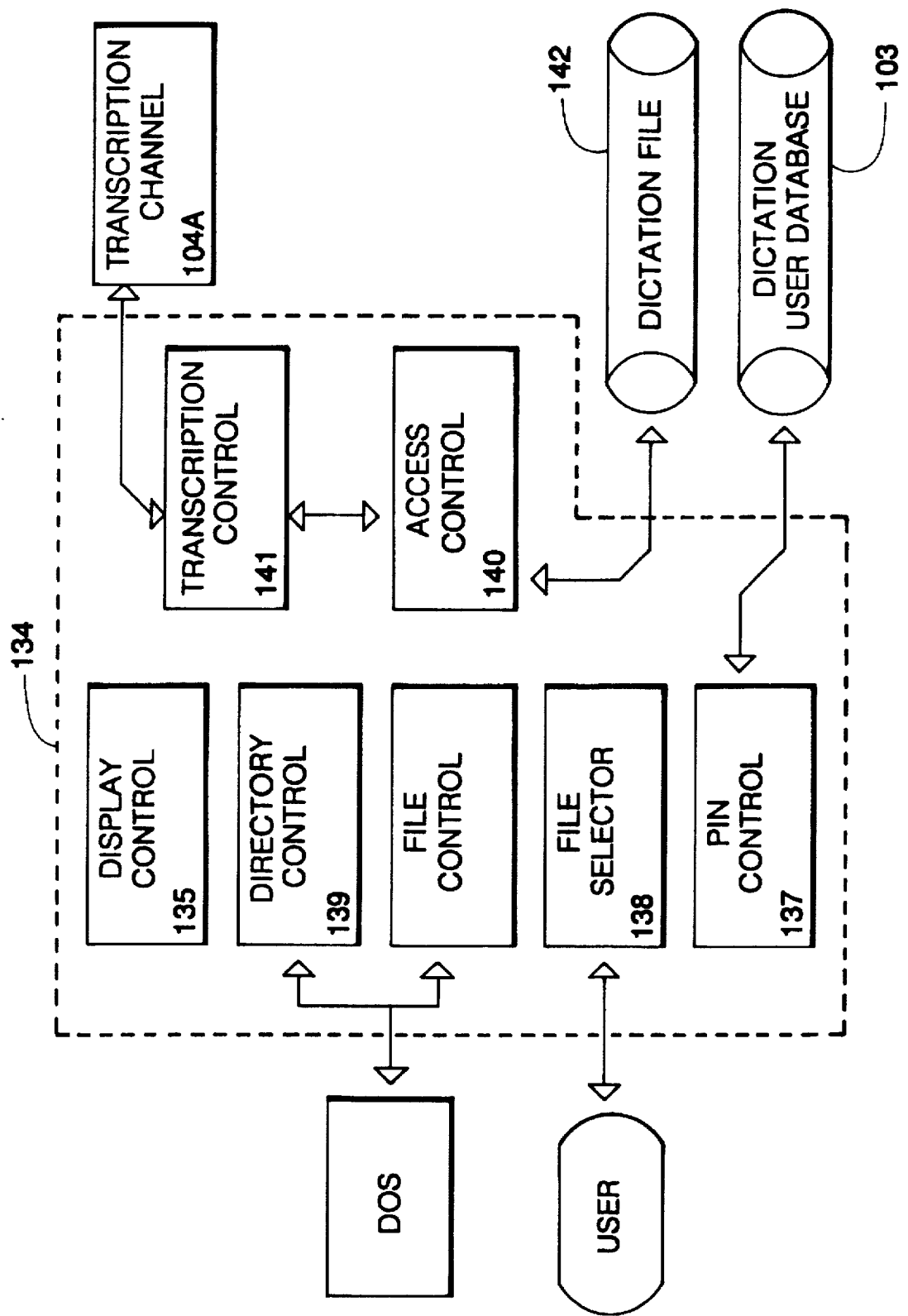
FIG. 18 is a block diagram of a transcription channel pop-up.

Turning to FIG. 18, the transcription channel pop-up 134 is the user's interface with the transcription channel software 116. This software provides a visual indication of what dictation files exist and what the status and importance of each file is. Status and importance are conveyed to the user by the display control 135. The user first chooses a file 142 from the current list or from another directory 139 and then enters an identification number (PIN) 137. The PIN must correspond with the user's selected password which is found in the selected dictation file 142 and the active dictation user database 103. Access to dictation files that have access protection (block 140) at or below the PIN level entered by the user will be passed by the transcription control 141 so that transcription can begin.

Dictation User Database

Figure 16:
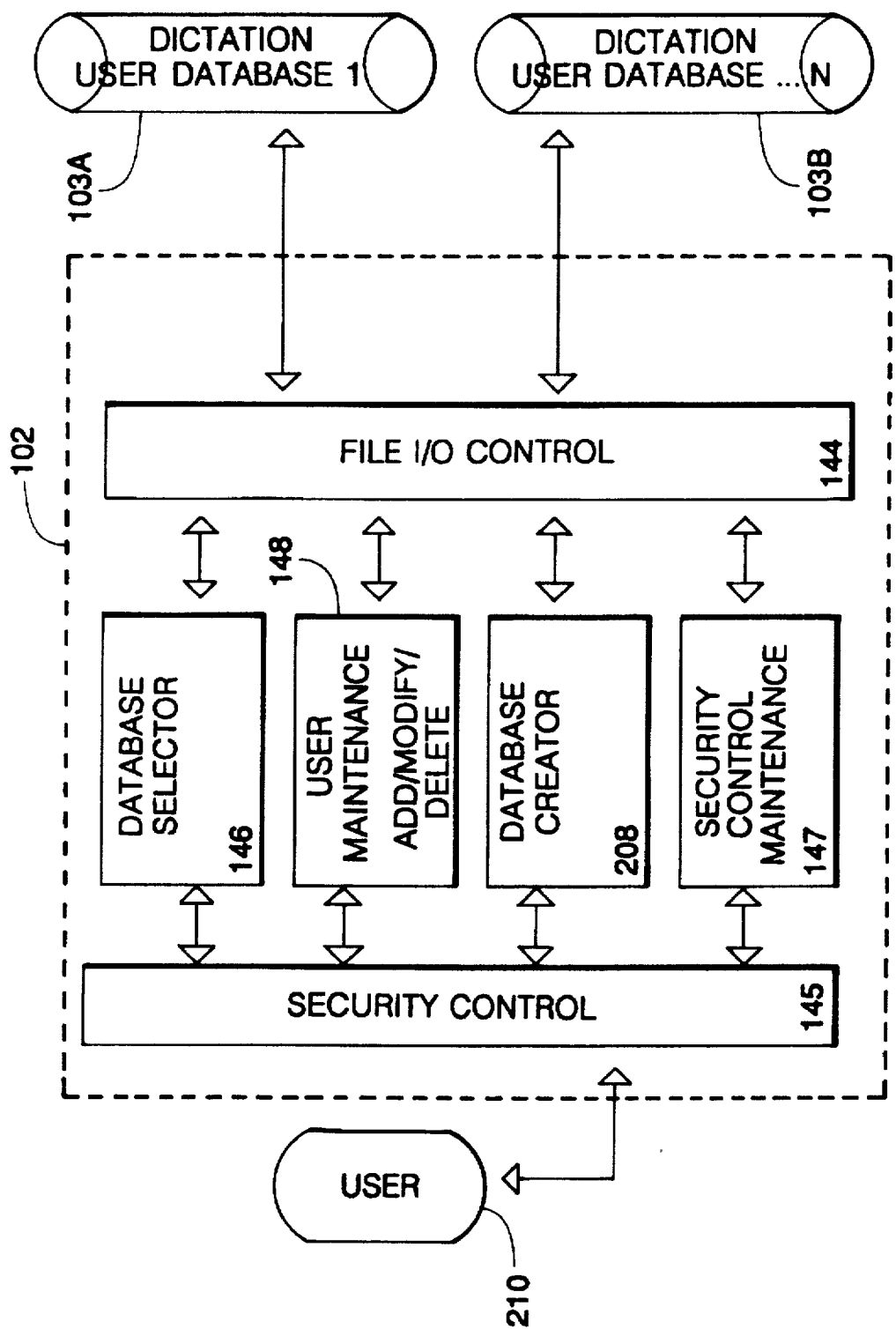
FIG. 16 is a block diagram of the dictation database manager of FIG. 9.

With brief reference to FIG. 9, dictation user databases 103 are created and maintained by dictation database manager software 102. The manager software is detailed in FIG. 16. Turning to this figure, the manager software comprises a security control block interfacing internally with a database selector block 146, a user maintenance block 148, a database creator block 208, and a security control maintenance block 147. Each of these blocks in turn interface with a file I/O control block 144. The security control block interfaces externally with a user 210 and the file I/O control block interfaces externally with dictation user databases 103a, 103b.

The dictation user database is made up of records each of which, if defined, describes a single dictation user. In operation, the security control does not allow unauthorized modification of the dictation user database. For those able to pass security control, a menu allows a selection of an existing database record through block 146, creation of a new database record through block 208, maintenance of a database record through block 148, and modification to the security password through block 147. By maintenance of the database record is meant the ability to add new users by adding another dictation user database record, delete a user by deleting a database record, or modify a dictation user database record.

The structure of a dictation user database record is shown in FIG. 22. Turning to this figure, each dictation user database record comprises a unique record ID 150, a unique user ID 151, the user's initials 152, and several passwords 154. General information 155 about the user consists of the user's name, department and telephone numbers. The passwords 154 allow for controlled access to voice files (i.e., dictation and message files) through use of the previously described transcription channel pop-up software of FIG. 18). Also included with each record is dictation control information 156.

DOS/Dictation Dispatcher Software

Figure 21:
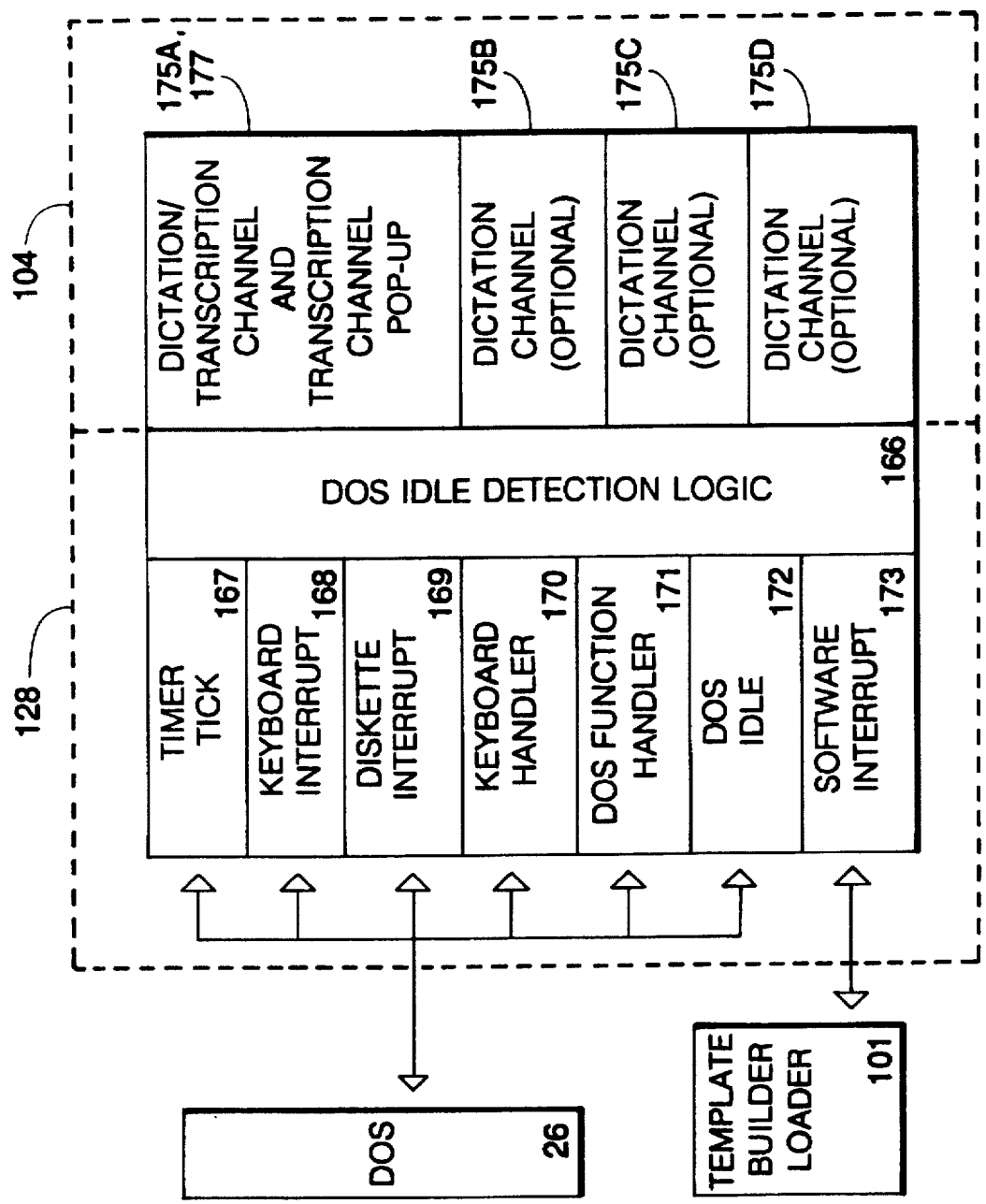
FIG. 21 is a block diagram of the DOS/dictation dispatcher of FIG. 9.

Turning to FIG. 21, the DOS/dictation dispatcher software 128 consists of logic 166 to detect when the operating system is in an idle state. It is during these idle times that the dispatcher software uses DOS and BIOS interrupts and handlers (namely, timer tick 167, keyboard interrupt 168, diskette interrupt 169, keyboard handler 170, DOS function handler 171, and DOS idle 172) to transparently use the diskette and keyboard resources of the host computer. (The dispatcher can also wrest control from DOS if for some reason the periods between idle times are too long.) The current template file determines which resources the TSR software of the system requires. The template builder/loader module 101 interfaces with dictation channel software 175a, 175b, 175c, 175d through the DOS/dictation dispatcher software 128 via a software interrupt 173 to load a template which defines a sequence of keystrokes and commands for the dictation channel software 175a, 175b, 175c, or 175d to execute.

Transparency of operation is possible because the dispatcher software is in the form of a TSR (terminate and stay resident) program. Functions are initiated by software interrupts 173 allowing the invention to function at the same time another application is running under DOS. Therefore, dictations may come in to the system with very little, if any, apparent impact to the user using the host computer. Since playback of transcription is also transparent to the host computer, the individual doing the transcription may utilise any word processing application available for a PC.

Channel/Hardware Configuration Control

Figure 10:
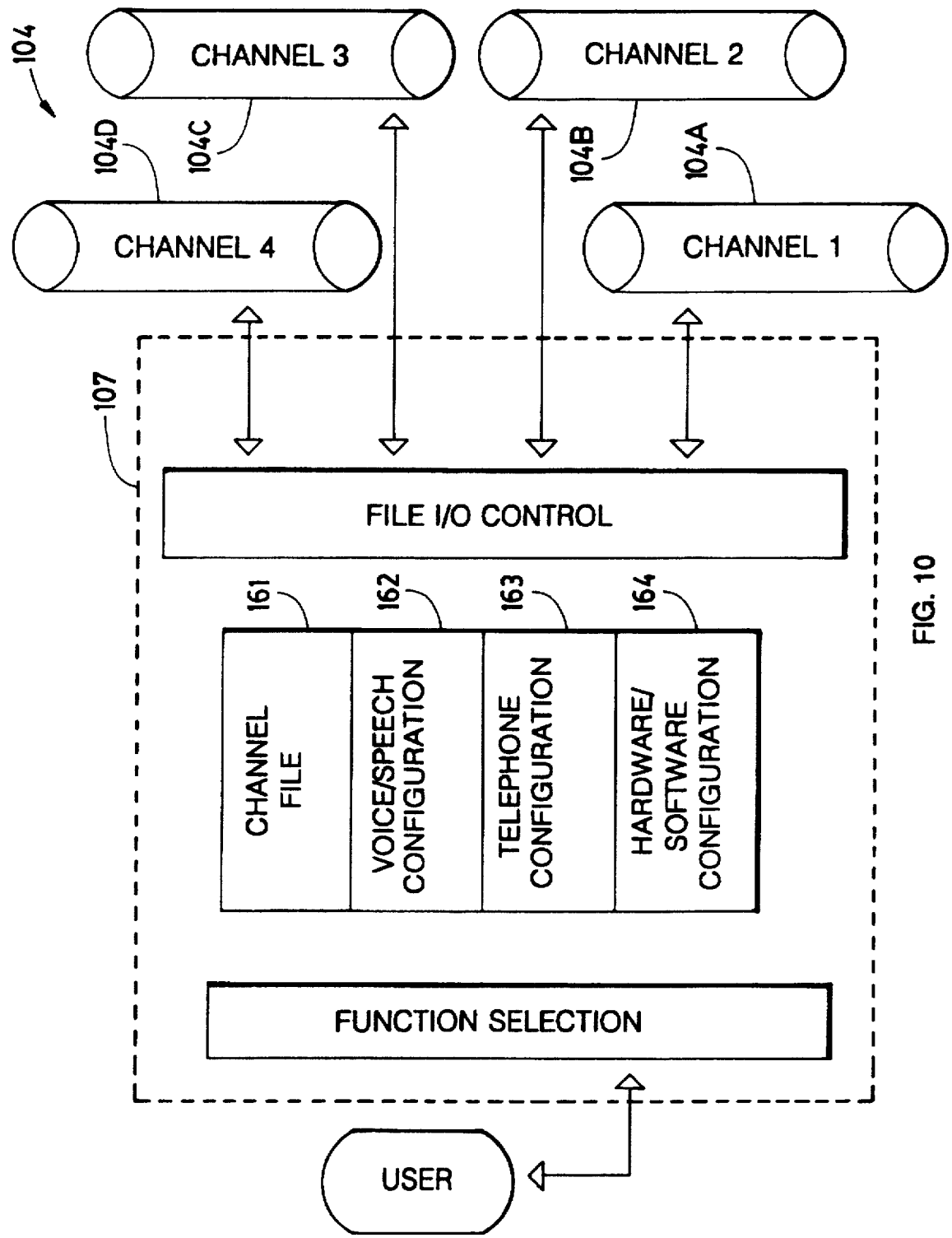
FIG. 10 is a block diagram detailing a portion of FIG. 9 indicating voice template interface options.

With reference to FIG. 10, each of the four possible channels 104a, 104b, 104c, and 104d is configured by the dispatcher (128 of FIG. 9) using a unique configuration file. Creation and maintenance of configuration files is depicted in FIG. 10. Functions are selected from the main menu. Configurations for each channel include voice/speech configuration through block 162, telephone configuration through block 163, and hardware/software configuration through block 164. Voice/speech configuration block 162 permits voice-activated switch (VOX) control, voice library selection, and controls over synthesis of a number during a text-to-speech operation. Hardware/software configuration block 164 allows the user to configure such things as the software interrupt the TSR software will use and the DMA channel to use. This block also allows configuration of the hardware on the expansion card (2 of FIG. 1) with address, hardware interrupt, DMA channel, and audio mute control information. This flexibility allows the system to be installed in almost any PC set up without contention or conflict.

Utilities

Three utility programs complement the rest of the invention's software. These three utilities are; Template Manager, Compression/Expander Facility and Import/Export Facility (110, 109, & 111 in FIG. 9).

Figure 17:
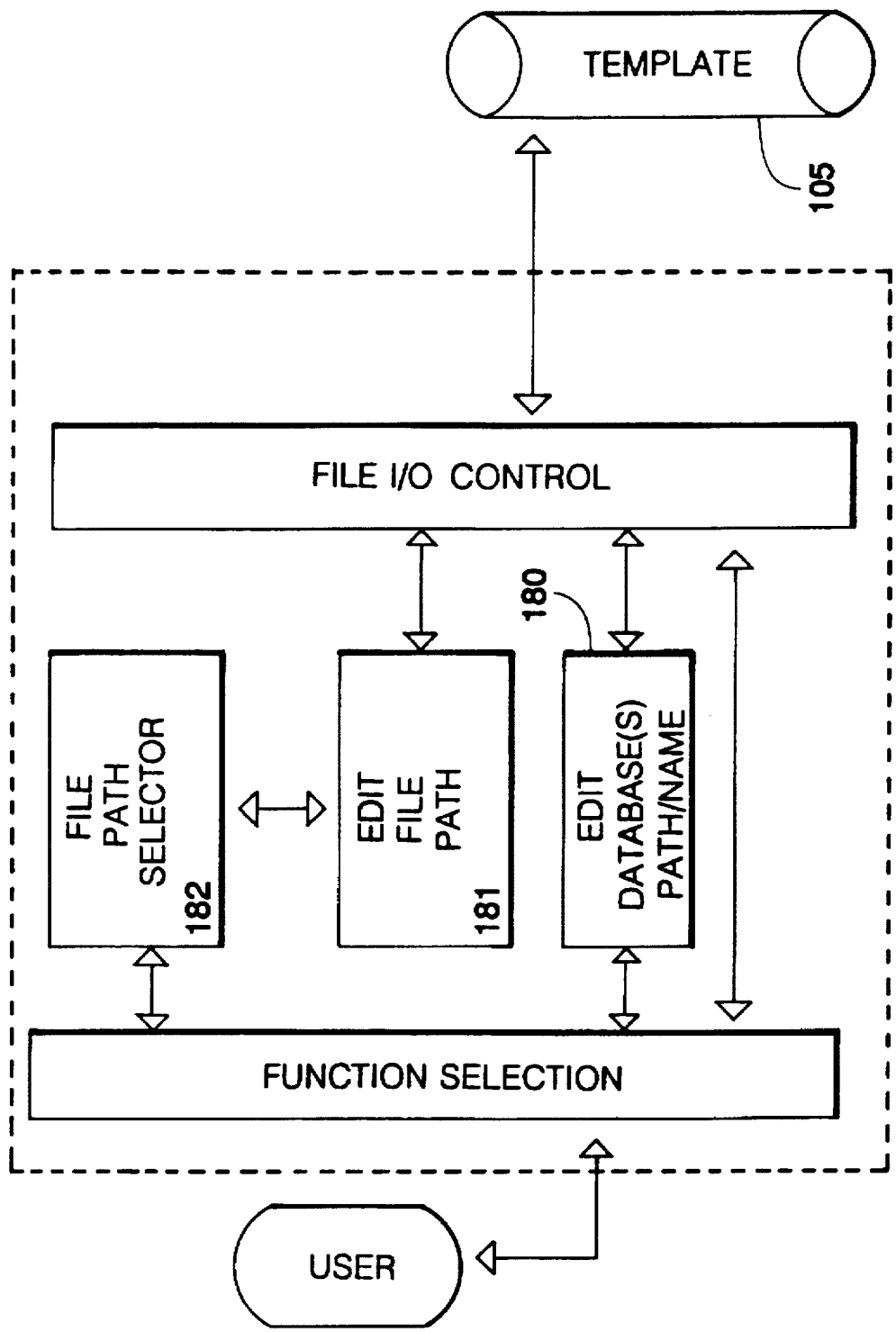
FIG. 17 is a block diagram of the template manager of FIG. 9.

As is shown in FIG. 9 and 17, the first of these utilities, Template Manager, interfaces with the template files 105. As a utility, this portion of the software is not crucial to the operation of the invention but does contribute to the invention's ease of use; an important characteristic of the invention. The template manager allows control over a template by presenting a menu with the options to edit any dictation database path 180 and name that are in a particular template or to edit other file paths 181, 182 within the template. Template manager software is an alternative to the template builder/loader software (FIG. 13) for the specific purposes described above.

Figure 14:
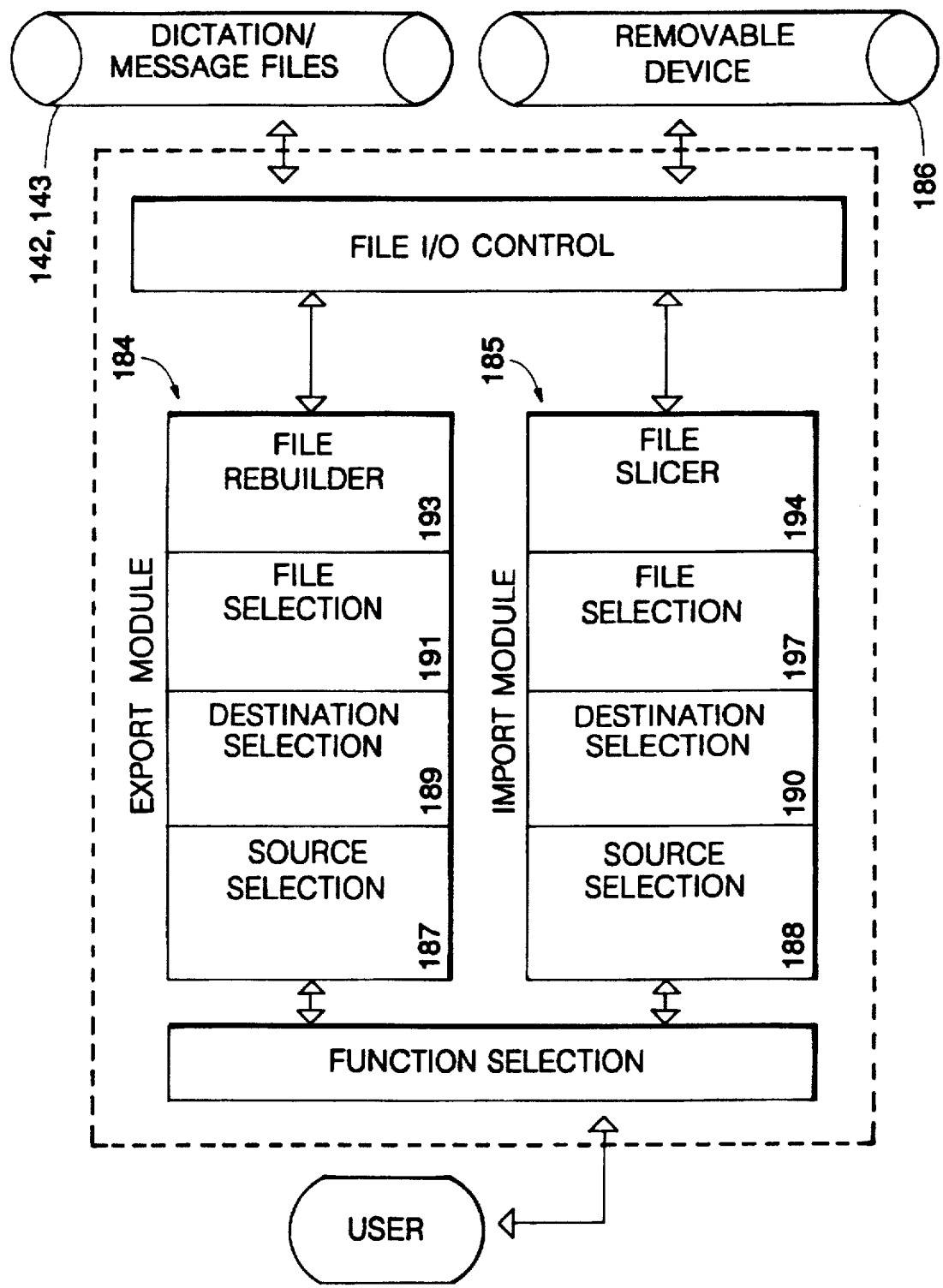
FIG. 14 is a block diagram of an import/export facility.

The import/export facility shown in FIG. 14 provides a means of transferring dictation or message voice files 142, 143 between systems. The user is presented with the option to export 184 (copy from hard disk to removable device 186) or import 185 (copy from removable device to hard disk) one or more dictation or message voice files 142, 143 files. Each of the import of export modules further allow the user to select files 191, 192 by their attributes and/or individually by name from a source drive/path combination chosen by the user 187, 188. Files are then transferred to the destination drive/path, again chosen by the user. Any files that are too large to be exported to a floppy in their entirety are split up 194 into variable length segments and are later rebuilt to their original state by the import module.

Figure 15:
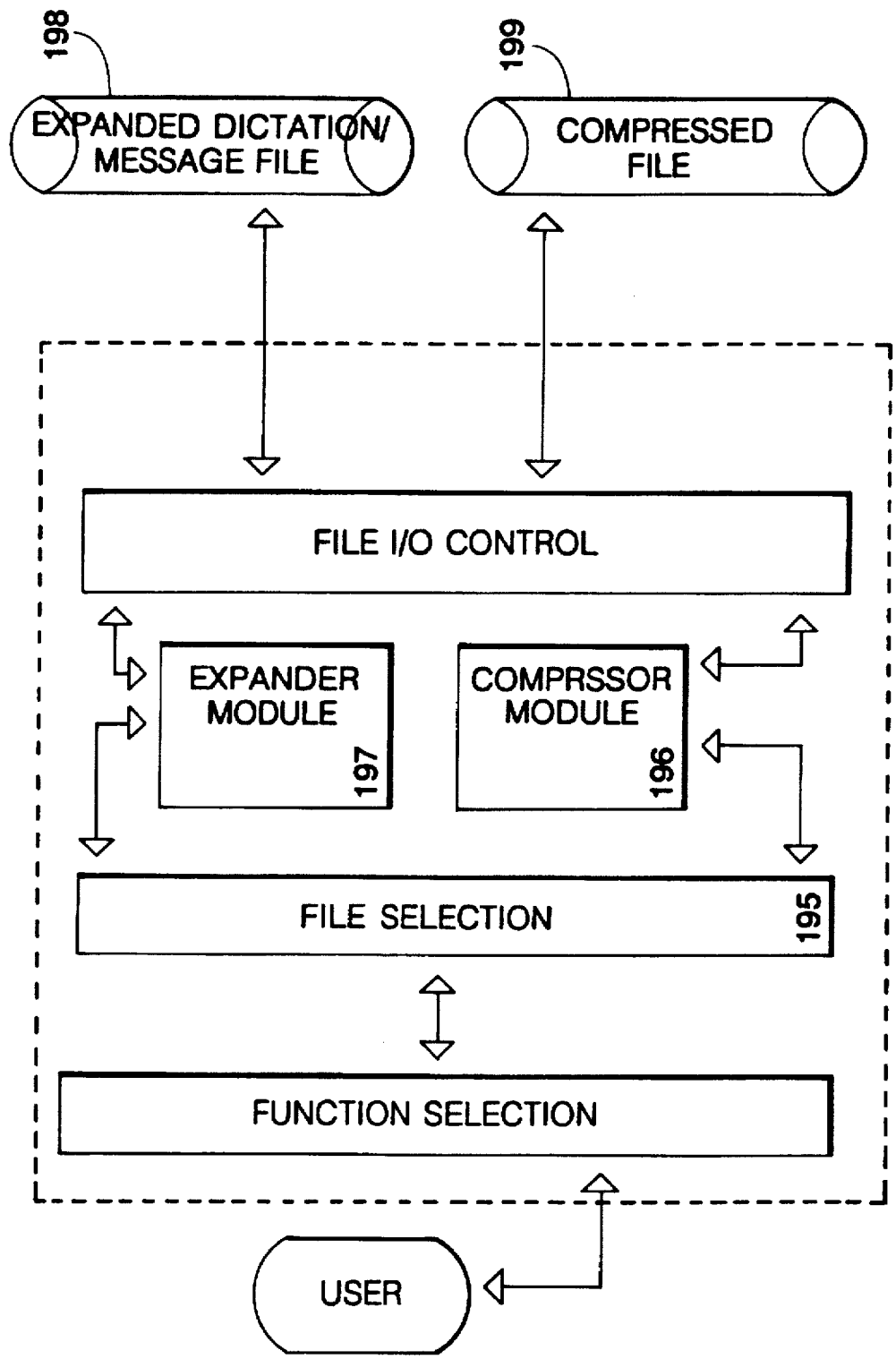
FIG. 15 is a block diagram of a compression/expansion facility.

A third utility is provided by the compression expander facility. This portion of the invention software allows the user, through appropriate menu selections, to compress and later expand dictation/message files significantly reducing the mount of storage space required. FIG. 15 illustrates the relationships between the user, software, and voice files. The software algorithms take advantage of repeating bit patterns within both dictation and message files (see FIG. 22 for file structure) to achieve considerable compression. Compressed files can then be archived using minimal mounts of storage resources.

Files are selected 195 by the user and then the user specifies whether the file should be compressed 196, 198 or expanded 197, 199. The expander module 197 includes algorithms to ensure that only previously compressed files 199 are expanded to dictation/message files 198. Likewise, the compressor module 196 also includes logic to ensure that only uncompressed dictation or message files 198 are compressed into a compressed file 199.

System Configuration/Installation

Figure 3:
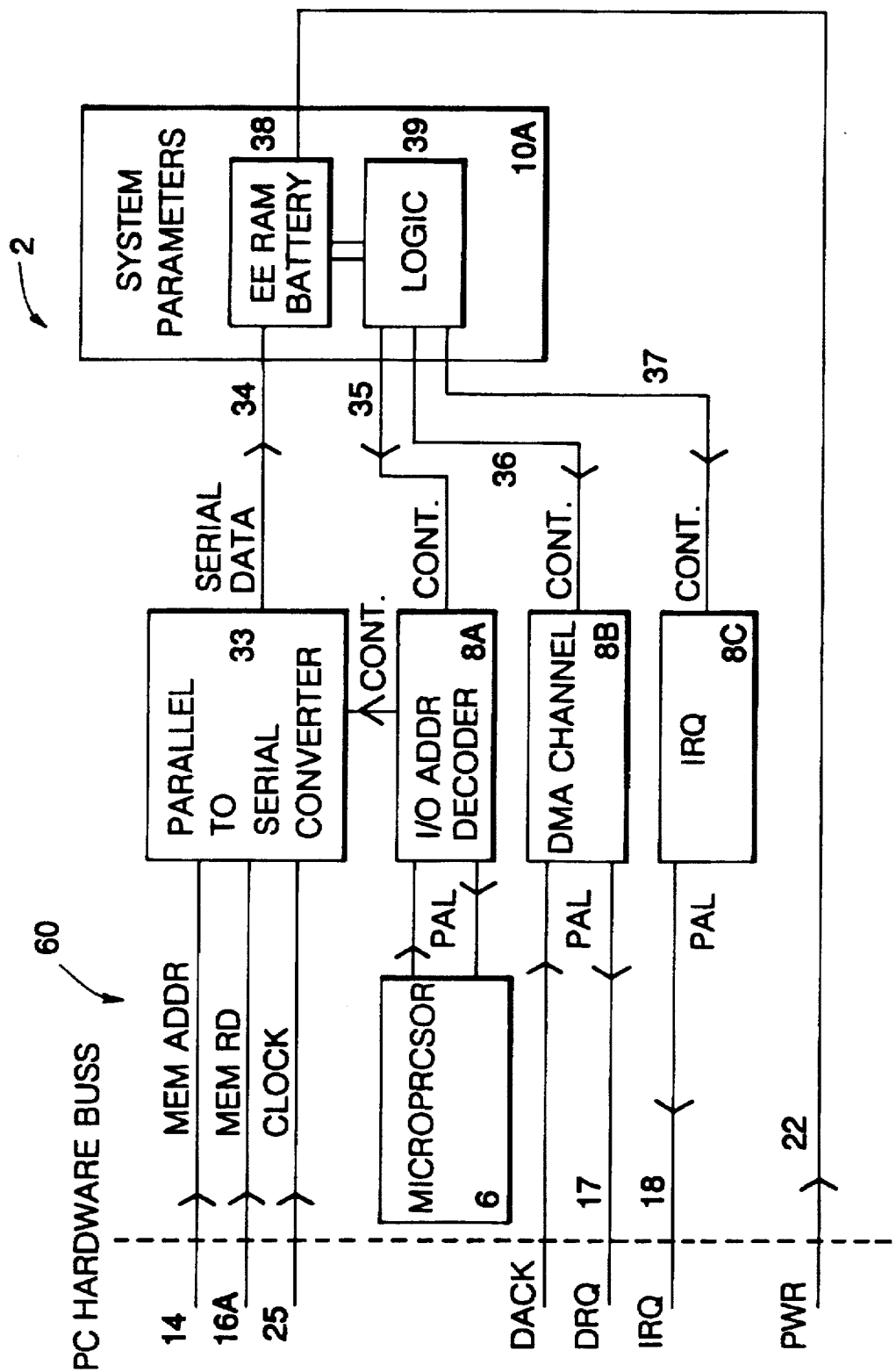
FIG. 3 is a block diagram of the programmable system configuration.

The system configuration is illustrated in FIG. 3. The expansion card 2 uses an I/O address for communications including a predefined DMA channel 8b and an optional predefined hardware interrupt (IRQ) 8c. The expansion card is configured via a memory read cycle in which the I/O address, DMA channel, and IRQ are specified predefined parameters are defined via a memory read cycle. The serial converter 33 sends this information to a device that has a non-volatile memory. The expansion card can be reset by a board identification switch which is set on the basis of a channel number. The switch settings define a specific memory address in which the board is first located. After the parameters have been programmed and tested, the serial converter may be locked to preclude the possibility of changing the expansion card parameters. Once the I/O address has been defined, the communication will occur via the address selected. The micro-controller 6 will then respond to instructions over the defined I/O address.

The expansion card 2 is installed by plugging same into a host PC and the DOS dictation dispatcher module 128 is loaded into the host. The dispatcher assesses the environment of the host, determining, for example, the interrupts used and the memory available. The dispatcher then takes over the host by disconnecting interrupts and the keyboard handier and taking over control of I/O. Assuming the dispatcher determines there is sufficient free memory, the remaining modules and the files are loaded into memory and the dispatcher sets appropriate memory pointers to indicate this memory space is now occupied. The system is then ready for use.

Modifications will be apparent to those skilled in the art and, accordingly, the invention is defined in the claims.

What is claimed is:

1. A system for the storage and playback of digitized voice on a host computer operating with a single tasking disk operating system and having a non-volatile memory and a resident memory and a direct memory access means, comprising the following:

- a controller operatively associated with said host computer;
- a voice processor operatively associated with said controller for converting incoming analog voice signals to digital signals for storage and for converting outgoing digital voice signals to analog signals for playback;
- an interface operatively associated with said controller for interfacing with an external microphone and speaker;
- said direct memory access means operatively associated with said controller for transferring digitized voice signals between said resident memory on said host computer and said controller;
- a terminate and stay resident program for providing program control for said host computer, said terminate and stay resident program for detecting when the disk operating system of said computer is idle and for, on detecting the disk operating system of said host computer is idle, selecting one from the group consisting of (i) prompting said direct memory access means to transfer data blocks of digitized voice signals in said resident memory to said controller, (ii) prompting said direct memory access means to transfer data blocks of digitized voice signals in said controller to said resident memory, (iii) initiating a disk operating system command to transfer data blocks in said resident memory to said non-volatile memory, or (iv) initiating a disk operating system command to transfer data blocks in said non-volatile memory to said resident memory;

whereby incoming analog voice signals are converted to digital signals and are selectively stored in, and retrieved from, said non-volatile memory or said controller under control of said terminate and stay resident program even when another task is operating on said single-tasking disk operating system.

2. The system of claim 1 wherein said digitized voice signals are formatted in the same manner as files created by said disk operating system.

3. The system of claim 1 including the following:

- a DTMF transceiver operatively associated with said controller for converting incoming DTMF tones to digital signals;
- template files comprising look-up tables equating digitized DTMF tone signals with commands recognized by said disk operating system; and
- means to compare incoming digitized DTMF tone signals with the digitized DTMF tone signals in said template files and, on a match with a DTMF tone signal stored in said template files, outputting to said disk operating system a command from said template files which corresponds to said matching DTMF tone signal, which command is recognized by said disk operating system of said host computer.

* * * * *